US011185194B2

(12) United States Patent
Gharibian

(10) Patent No.: US 11,185,194 B2
(45) Date of Patent: Nov. 30, 2021

(54) BATH SPOUT COVER

(71) Applicant: MUNCHKIN, INC., Van Nuys, CA (US)

(72) Inventor: Nairi Gharibian, Glendale, CA (US)

(73) Assignee: Munchkin, Inc., Van Nuys, CA (US)

( * ) Notice: Subject to any disclaimer, the term of this patent is extended or adjusted under 35 U.S.C. 154(b) by 0 days.

(21) Appl. No.: 16/118,050

(22) Filed: Aug. 30, 2018

(65) Prior Publication Data

US 2019/0059658 A1  Feb. 28, 2019

Related U.S. Application Data

(60) Provisional application No. 62/552,323, filed on Aug. 30, 2017.

(51) Int. Cl.
*A47K 3/00* (2006.01)
*E03C 1/046* (2006.01)
*F16K 27/12* (2006.01)
*E03C 1/042* (2006.01)

(52) U.S. Cl.
CPC .............. *A47K 3/005* (2013.01); *E03C 1/046* (2013.01); *E03C 1/042* (2013.01); *F16K 27/12* (2013.01)

(58) Field of Classification Search
CPC ...... A47K 3/003; A47K 3/005; E03C 1/0412; E03C 1/046–0465; E03C 1/0404–1/0407; Y10T 24/314–316
See application file for complete search history.

(56) References Cited

U.S. PATENT DOCUMENTS

| 4,353,139 | A | * | 10/1982 | Wainwright | A47K 3/001 239/211 |
| 4,367,572 | A | * | 1/1983 | Zielenski | B60R 16/04 24/301 |
| 5,125,577 | A | * | 6/1992 | Frankel | E03C 1/02 239/211 |
| 6,205,598 | B1 | * | 3/2001 | Black | A47K 3/001 4/580 |
| 6,409,099 | B1 | * | 6/2002 | Goodwin | B05B 7/2467 239/310 |
| 8,371,514 | B2 | * | 2/2013 | Finell | A47K 5/12 239/289 |
| 8,424,129 | B2 | * | 4/2013 | Henderson | A47K 3/005 4/661 |
| 2007/0130688 | A1 | * | 6/2007 | Thorne | A47K 3/005 4/675 |
| 2019/0090696 | A1 | * | 3/2019 | Zeanah | A47K 3/005 |

* cited by examiner

*Primary Examiner* — David P Angwin
*Assistant Examiner* — Nicholas A Ros
(74) *Attorney, Agent, or Firm* — Alan D. Borelli, Esq.; Robert Z. Evora, Esq.

(57) ABSTRACT

A bath spout cover having a body structure, which has an upper portion having two sides extending therefrom. The body structure may also have a front portion. A soap receptacle may be disposed in the body structure. There may also be at least one strap connecting an inner side of the two sides of the body structure.

15 Claims, 32 Drawing Sheets

BATH SPOUT COVER

CROSS REFERENCE TO RELATED APPLICATION

This application claims priority to U.S. Provisional Application Ser. No. 62/552,323 filed Aug. 30, 2017, the contents of all of which are hereby incorporated by reference herein in their entirety into this disclosure.

TECHNICAL FIELD

The subject disclosure relates to a cover for a bath spout and a method of securing thereto. In particular, to constructing a flexible strap for securing the cover to the bath spout.

BACKGROUND

Bathtub surfaces can be inherently slippery and dangerous. Likewise, the spout extending from one end becomes a dangerous protruding object. Children and infants bathing and playing in tubs are prone to knocking into the spout with their heads or other parts of their body hurting themselves. Consequently, numerous protective covers have been developed in an effort to prevent against this. However, the difficulty challenged is keeping the cover securely attached to the spout during use.

BRIEF DESCRIPTION OF THE DRAWINGS

Various exemplary embodiments of this disclosure will be described in detail, wherein like reference numerals refer to identical or similar components or steps, with reference to the following figures, wherein.

DETAILED DESCRIPTION

Particular embodiments of the present invention will now be described in greater detail with reference to the figures.

FIGS. 1-32 show various views of a spout cover 10 according to this disclosure.

Figure 1:
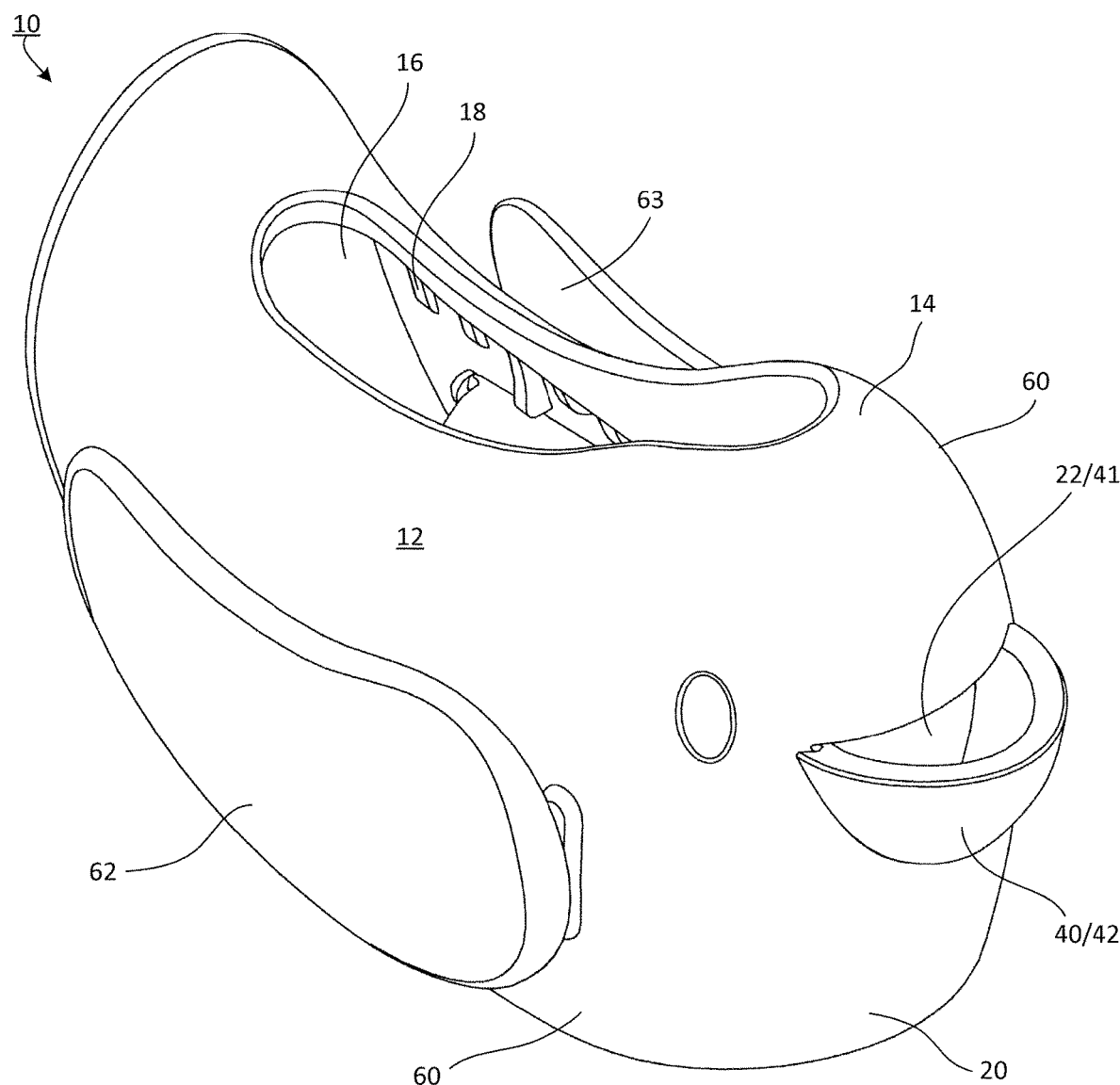
FIG. 1 is a top perspective view of a spout cover according to the subject disclosure.
Figure 2:
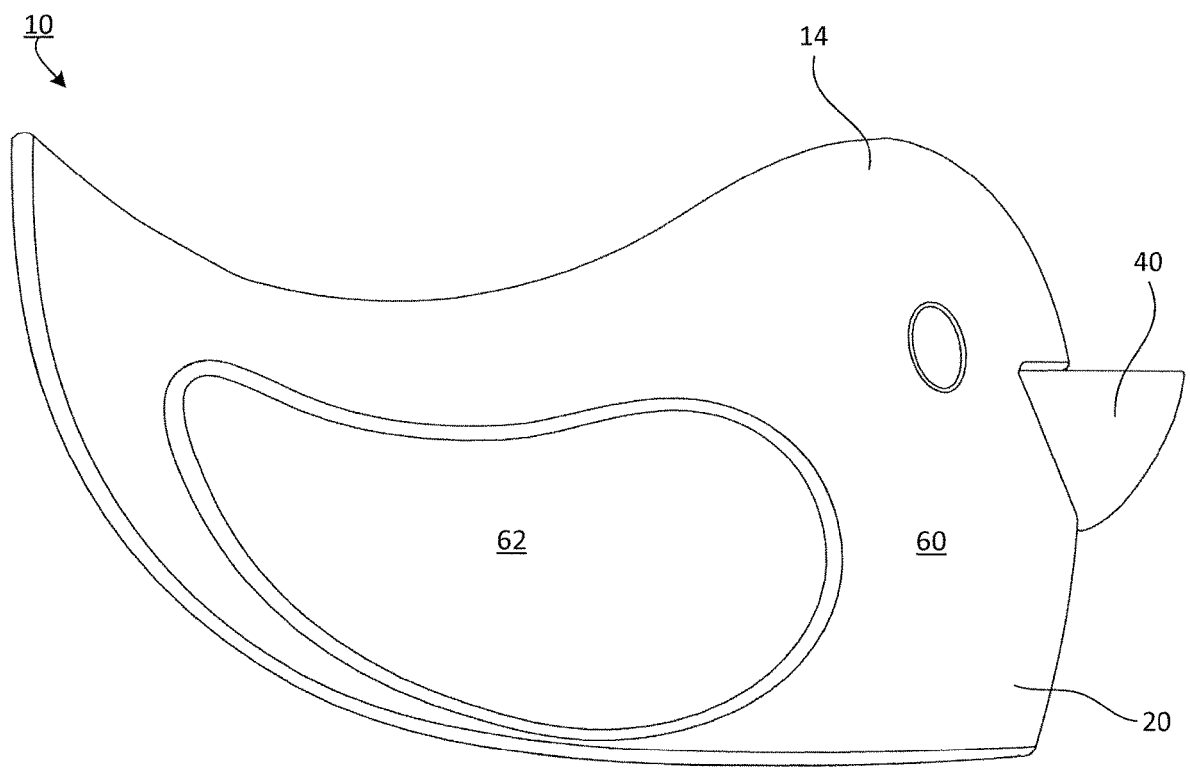
FIG. 2 is a left view of the spout cover of FIG. 1.
Figure 3:
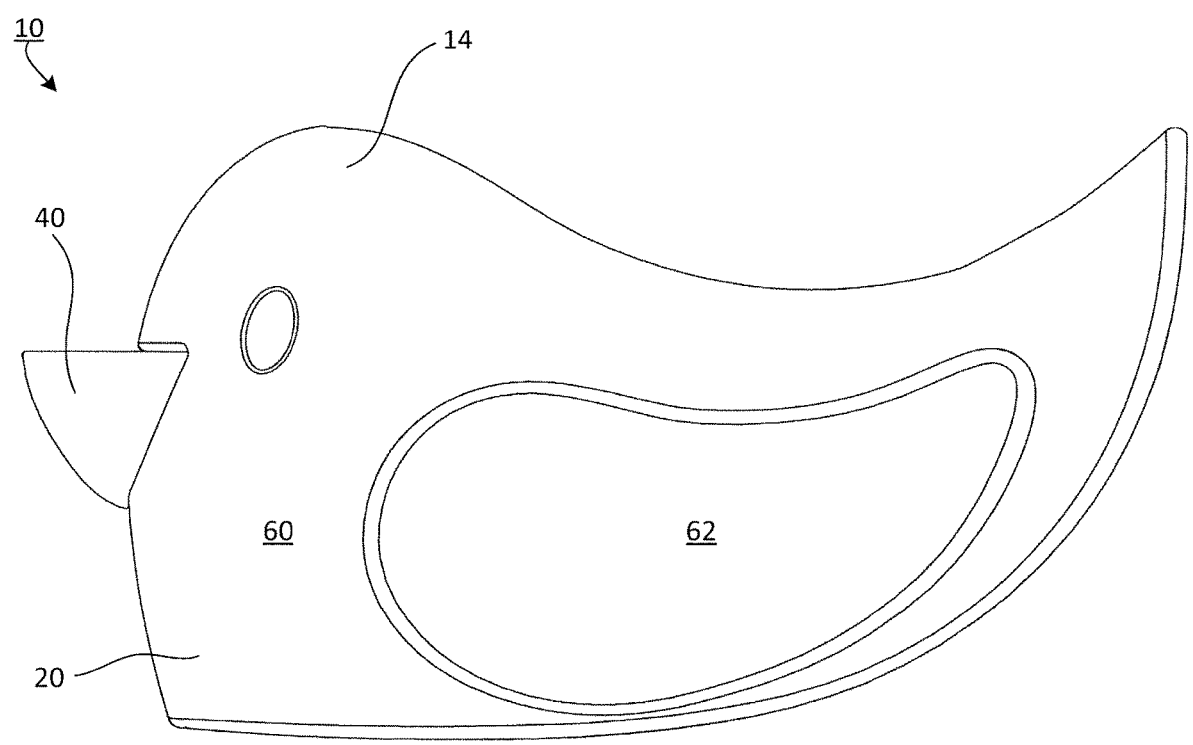
FIG. 3 is a right view of the spout cover of FIG. 1.
Figure 4:
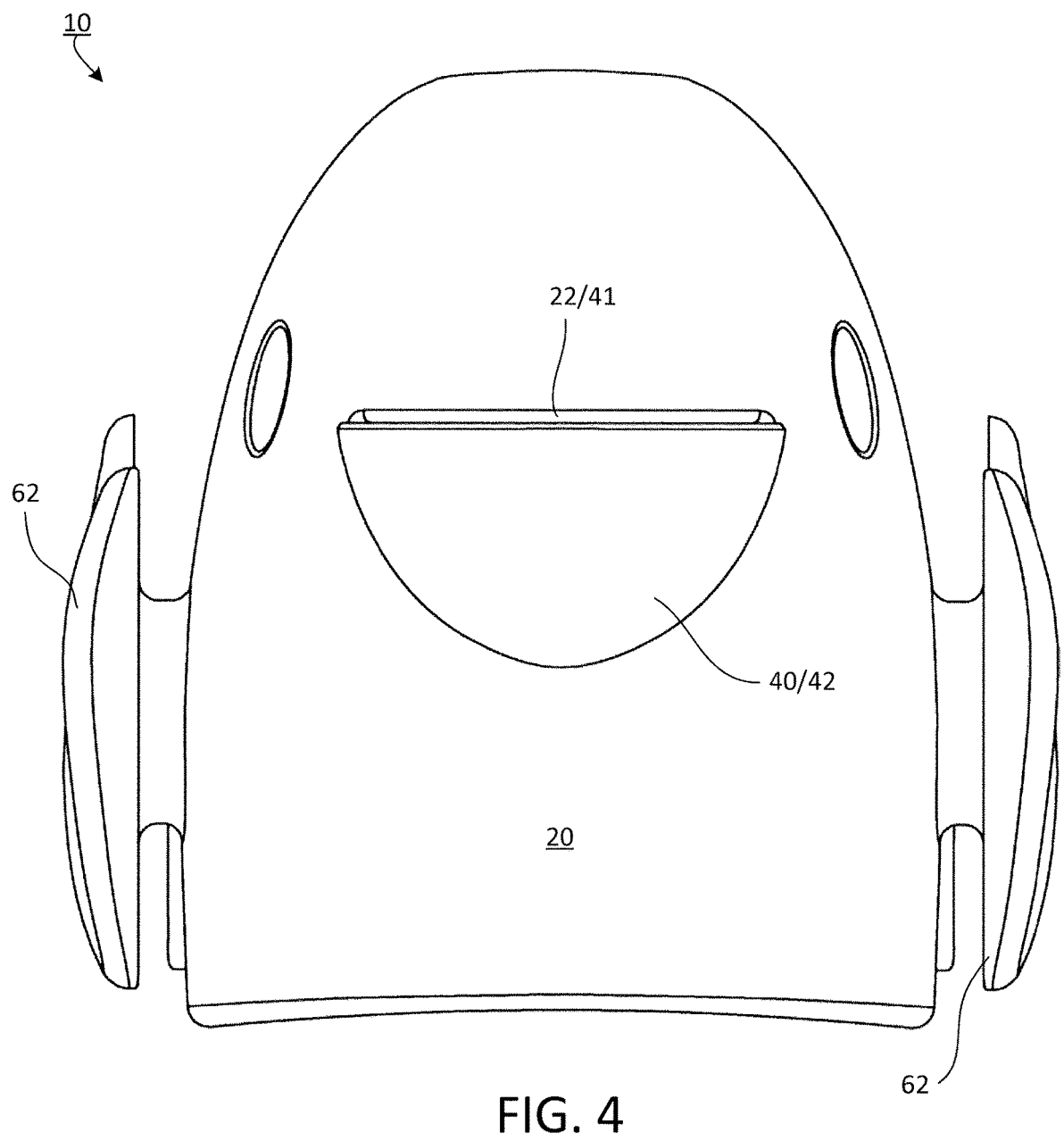
FIG. 4 is a front view of the spout cover of FIG. 1.

FIG. 1 includes a perspective view of an exemplary bath spout cover 10 in accordance with the presently-disclosed subject matter. In this exemplary embodiment, the bath spout cover 10 is provided that comprises a body structure 12 having an upper portion 14; two opposing sides 60 and a front portion 20; a soap receptacle assembly 40 defined on the front portion between the two opposing sides 60; and at least one strap 30 (FIG. 7) spanning the two opposing side portions 60.

The body structure 12 is made of a flexible resilient material that allows for easy installation over a bath faucet 90. The body structure 12 is provided with enough rigidity to maintain its structure but soft and flexible enough to not harm a young child that may bump into the body structure 12 during use. Furthermore, the material may protect the young child from the heat of a hot bath faucet 90. For example, the material may incorporate Munchkin's White Hot technology, which alerts users when the material is too hot. Although shown as a duck, any suitable shape or animal may be used to provide protection against the bath faucet 90 or similar spigot.

Figure 12:
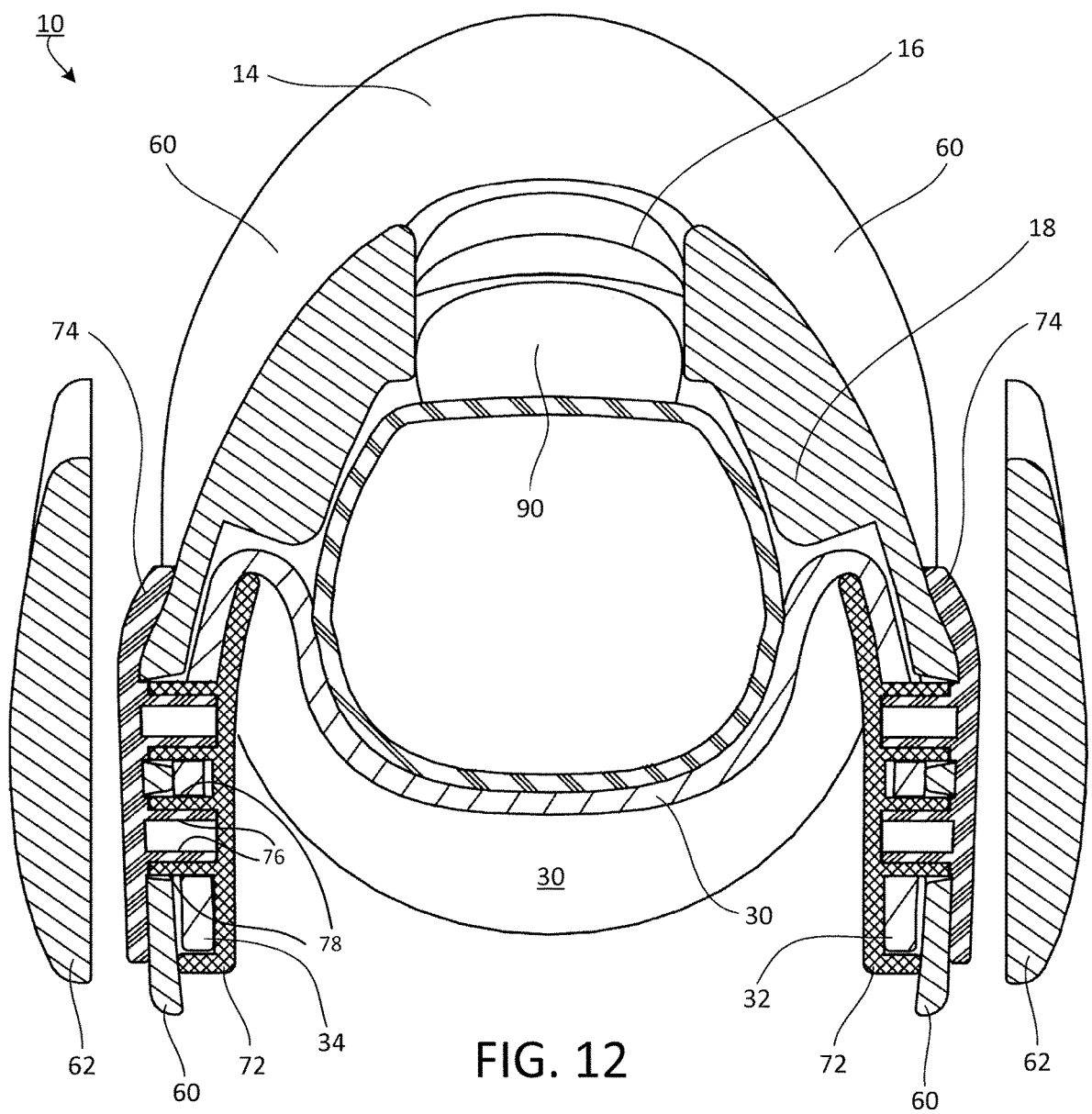
FIG. 12 is a cross section view A-A of FIG. 9 in use with a faucet without a valve.
Figure 13:
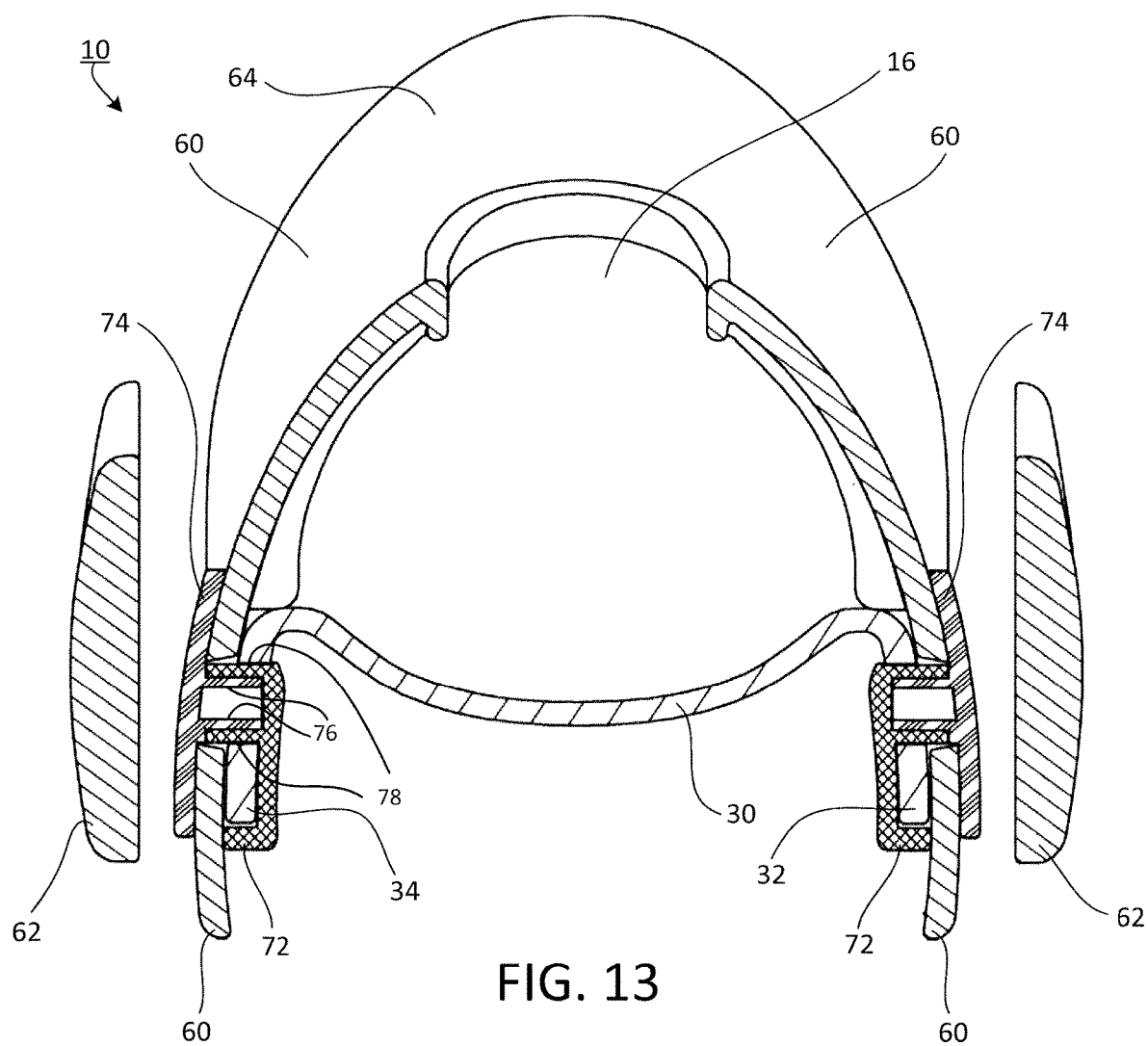
FIG. 13 is a cross section view B-B of FIG. 9.
Figure 14:
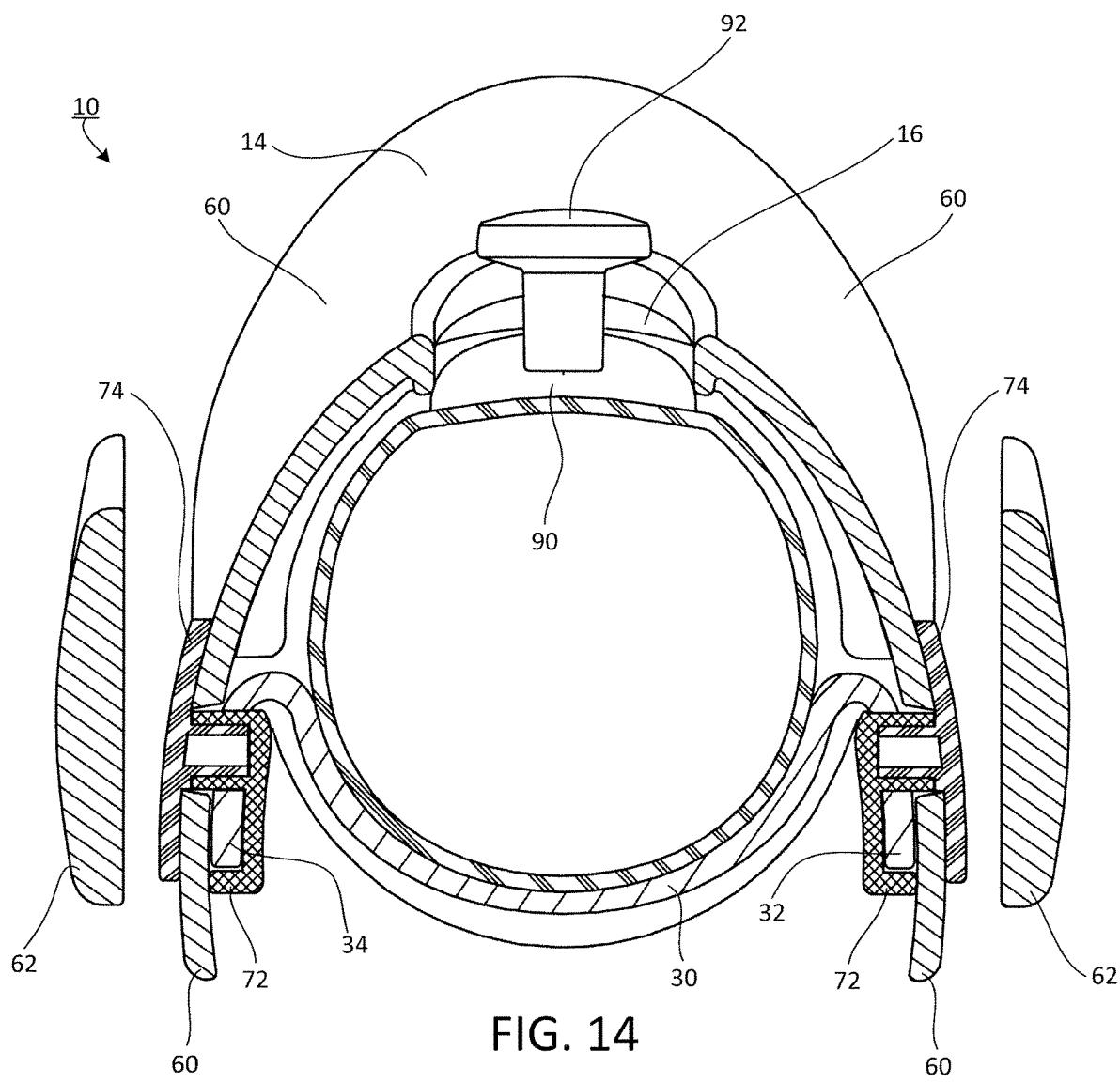
FIG. 14 is a cross section view B-B of FIG. 9 in use with a faucet having a valve.
Figure 15:
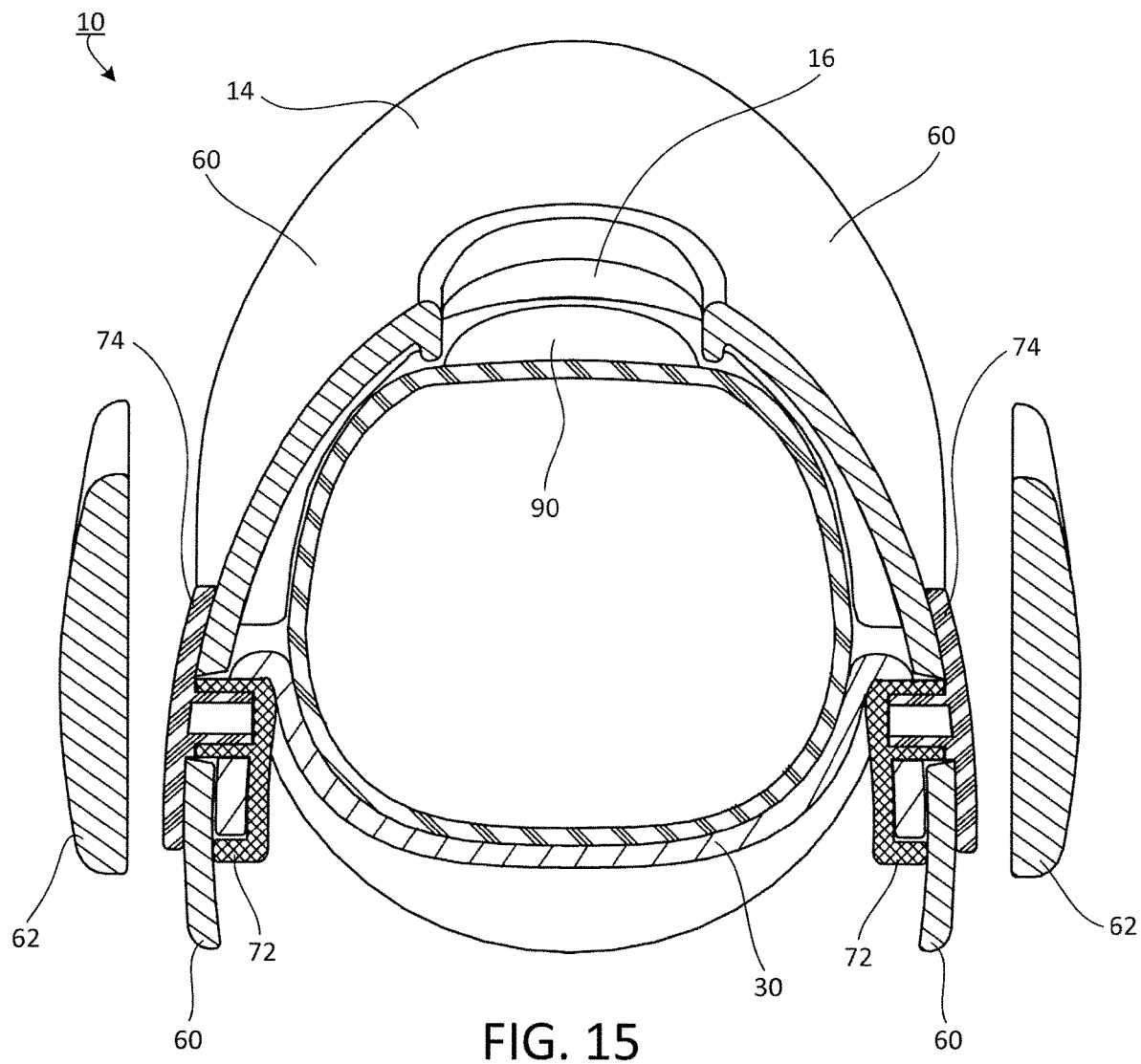
FIG. 15 is a cross section view B-B of FIG. 9 in use with a faucet without a valve.

As shown in FIGS. 5-7 and 12, alignment ribs 18 may be disposed along the inside 15 of the upper portion 14. These alignment ribs 18 allow for proper alignment of the spout cover 10 with the bath faucet 90 and provide further support to the overall body structure 12 of the bath spout cover 10. The alignment ribs 18 may further be made integral with body structure 12 as shown in FIG. 12 or may be of a separate material and strongly connected with body structure 12. Although shown as curved, elongated, rectangular, linelike ribs, the alignment ribs 18 may take any suitable geometric shape and/or size that allows for proper alignment of the spout cover 10 with the bath faucet 90.

Figure 9:
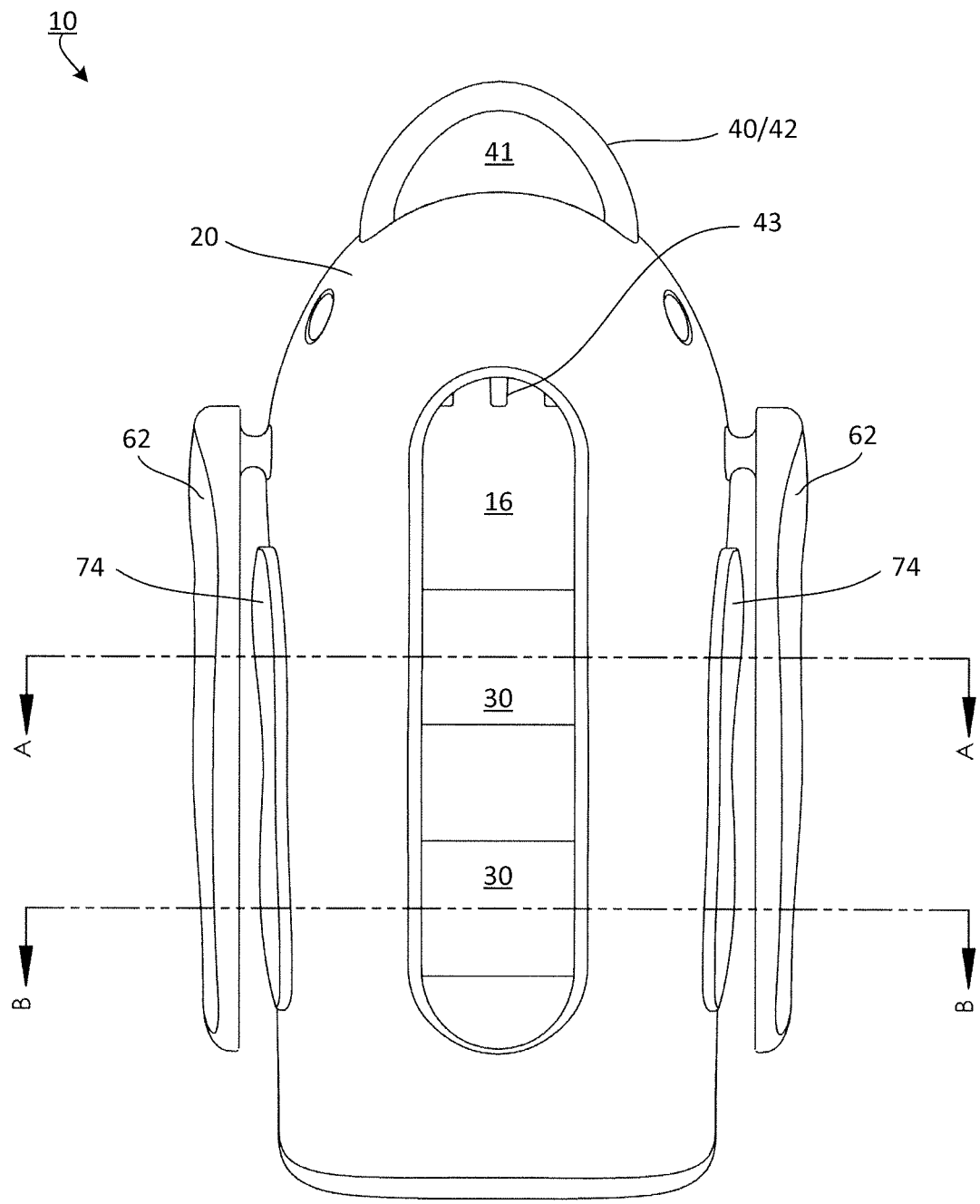
FIG. 9 is a top view of the spout cover of FIG. 1.
Figure 10:
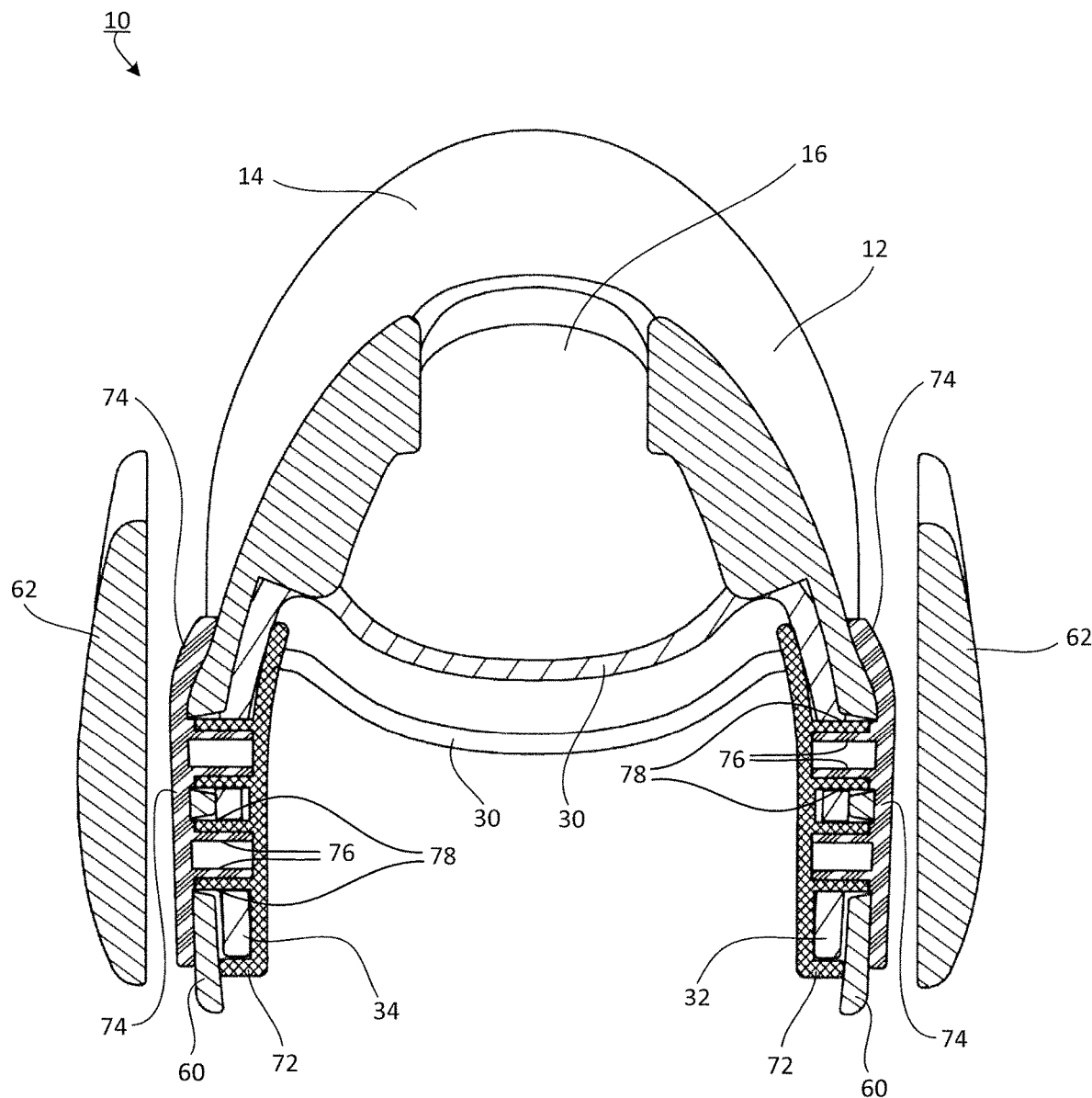
FIG. 10 is a cross section view A-A of FIG. 9.
Figure 11:
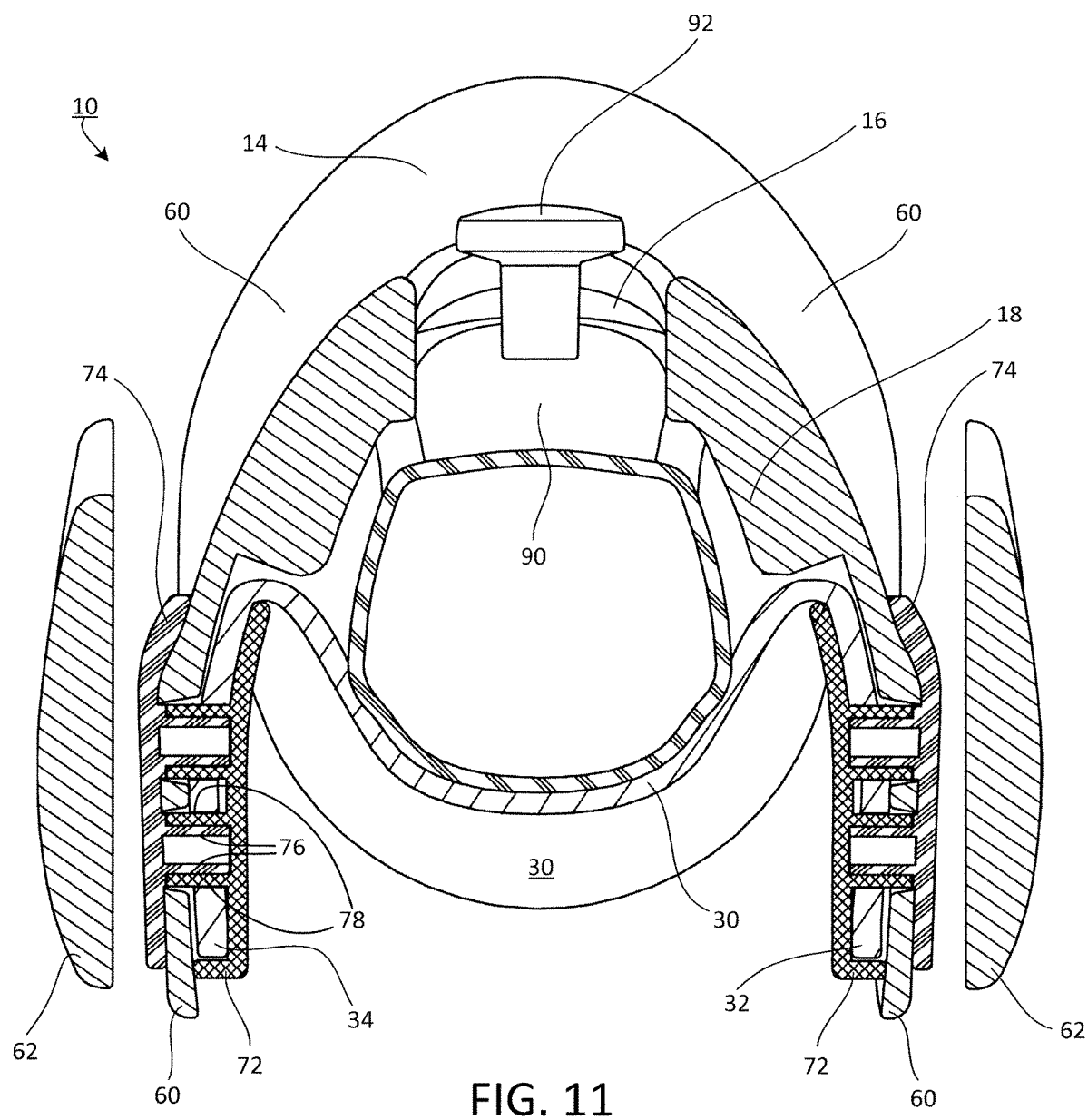
FIG. 11 is a cross section view A-A of FIG. 9 in use with a faucet having a valve.
Figure 17:
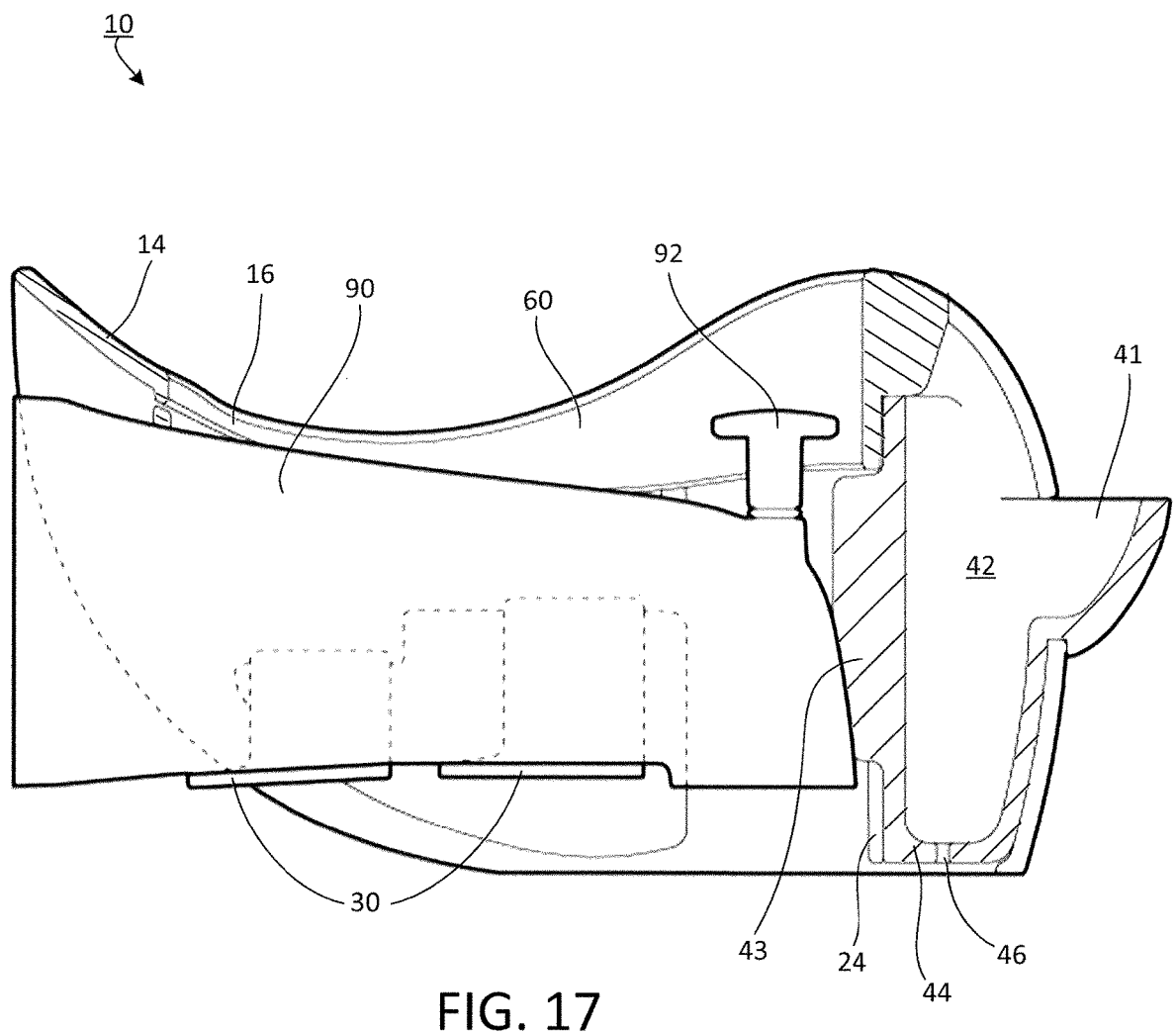
FIG. 17 is a cross section view of the spout cover of FIG. 1.
Figure 18:
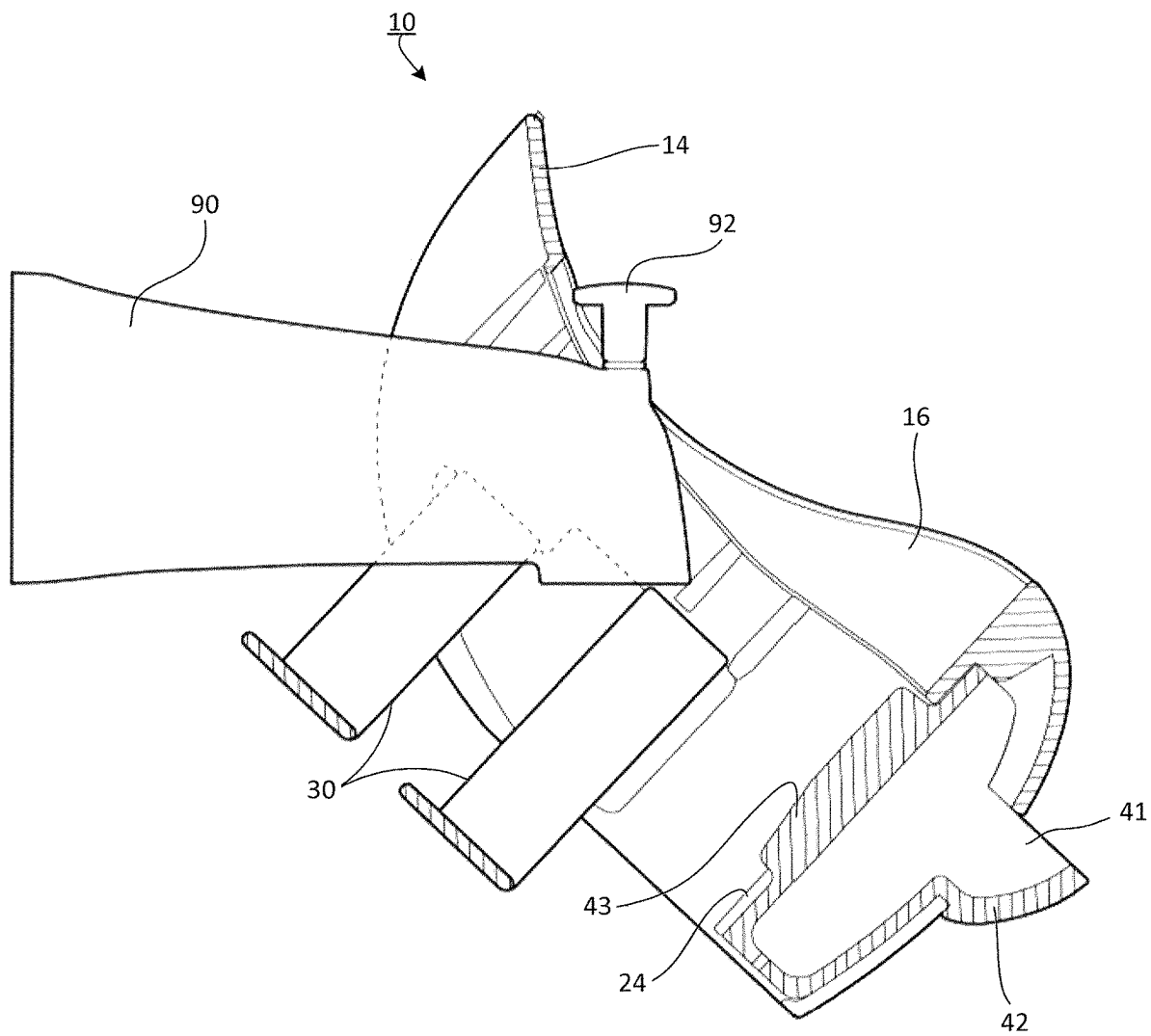
FIG. 18 is a cross section view of the spout cover of FIG. 1 in use.

FIGS. 1 and 9 illustrate that the bath spout cover 10 may have an elongated opening 16 disposed in, and along upper portion 14. The elongated opening 16 allows the bath spout cover 10 to accommodate a valve 92 (FIG. 18) on the bath faucet 90 during installation, use and removal (FIGS. 17-18). The elongated opening 16 may take any suitable shape or size to allow for the bath spout cover 10 to accommodate the valve 92 on the bath faucet 90 during installation, use and removal. As shown in FIGS. 27-31, the elongated opening 16 may also be in the shape of an elongated figure eight.

Figure 16:
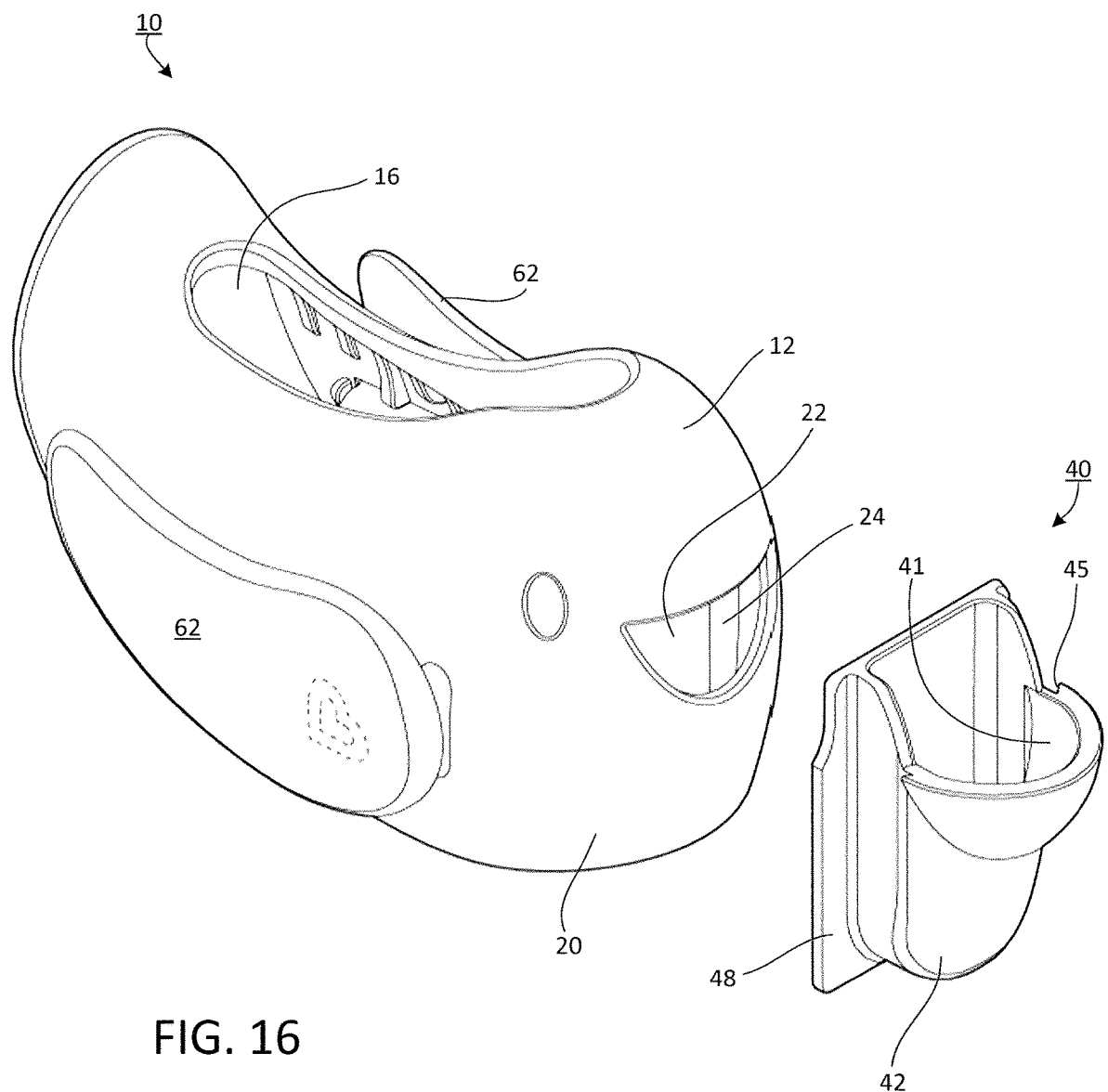
FIG. 16 is an exploded view of the spout cover of FIG. 1.

FIGS. 1 and 16 show a soap receptacle 42 disposed in the soap container assembly 40, such that the soap receptacle 42 has a soap receptacle receiving portion 41 that is adapted to readily receive soap in an assembled position. As further shown in FIG. 16, the soap container assembly 40 may be made of one integral unit or may be made of multiple units that allow for easy assembly and disassembly (not shown). Similarly, the soap container assembly 40 may be made of one integral unit (not shown) with the body structure 12.

Figure 22:
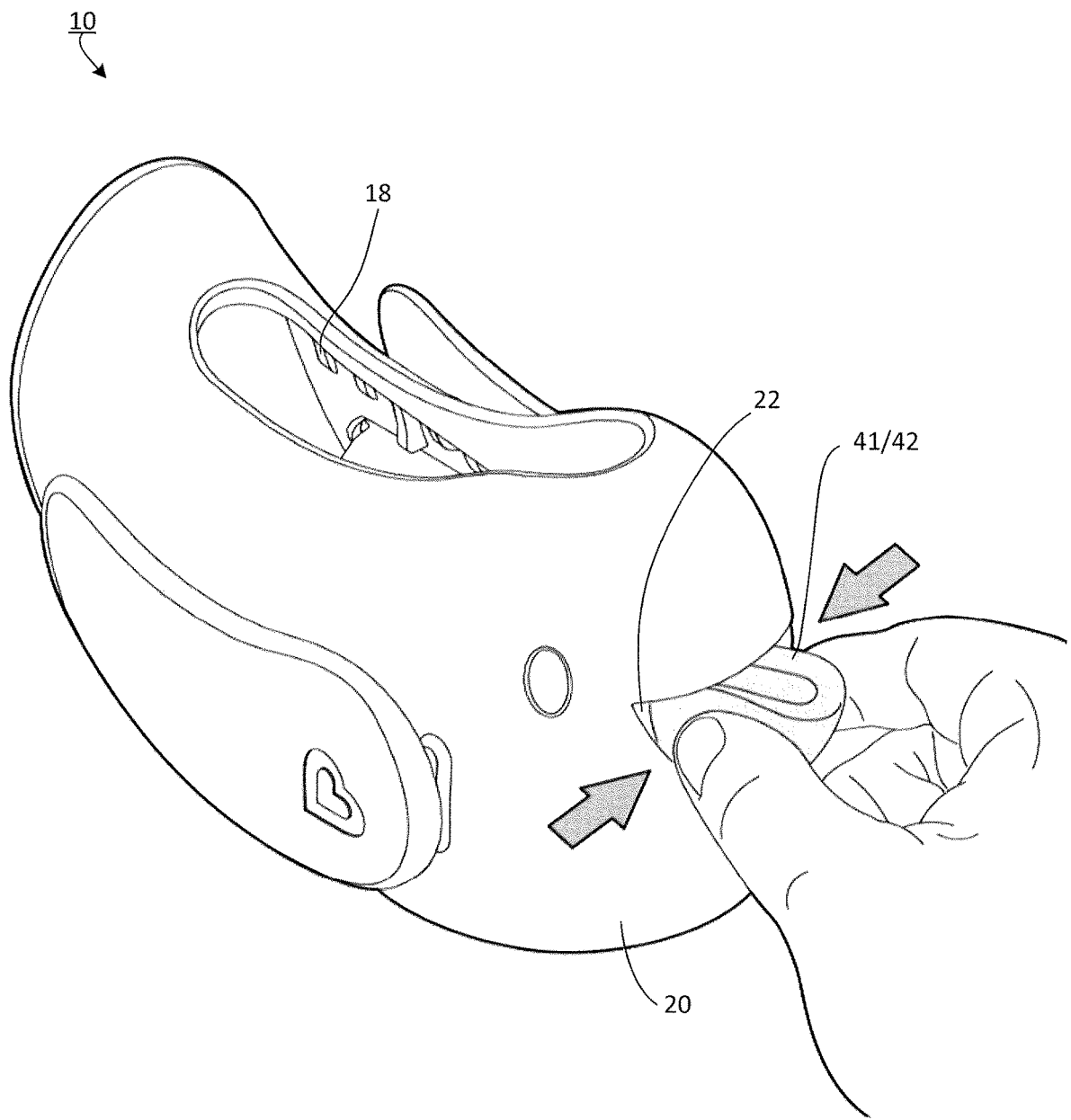
FIG. 22 is a perspective view of the spout cover of FIG. 1 during removal.
Figure 23:
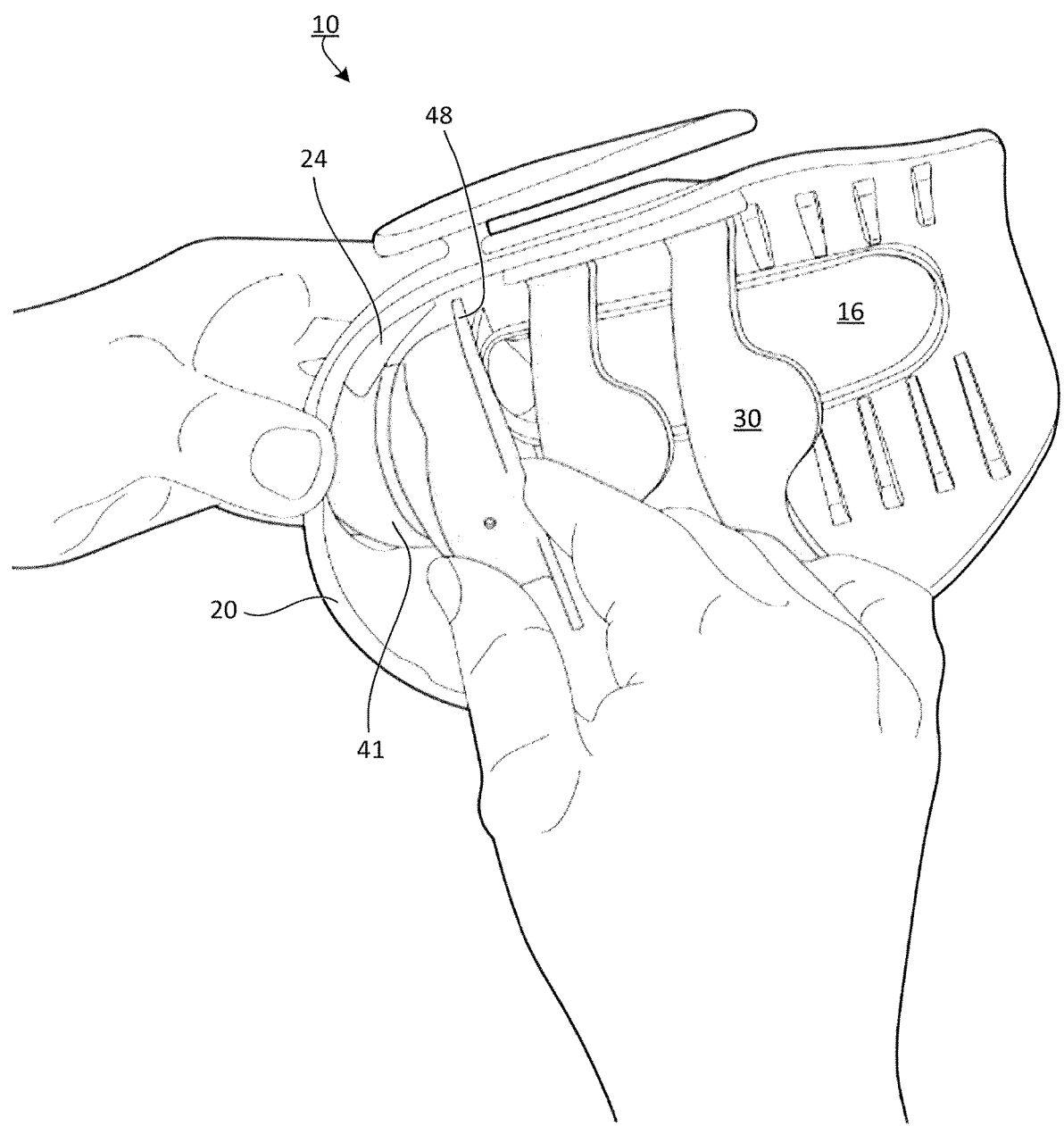
FIG. 23 is a bottom perspective view of the spout cover of FIG. 1 during removal of the soap receptacle assembly.

FIGS. 22 and 23 illustrate the soap receptacle 42 and the soap receptacle receiving portion 41 are made of a material that is sufficiently resilient to retain its shape during use, but flexible enough to be removed by being manipulated through an opening 22 in the body structure 12 by an adult.

Although shown as a beak, the soap container assembly 40 may be made of any suitable shape that allows for proper receiving of soap in an assembled position and allows for soap draining through a soap drain hole 46 and mixing with a flow of water from a spout.

Figure 5:
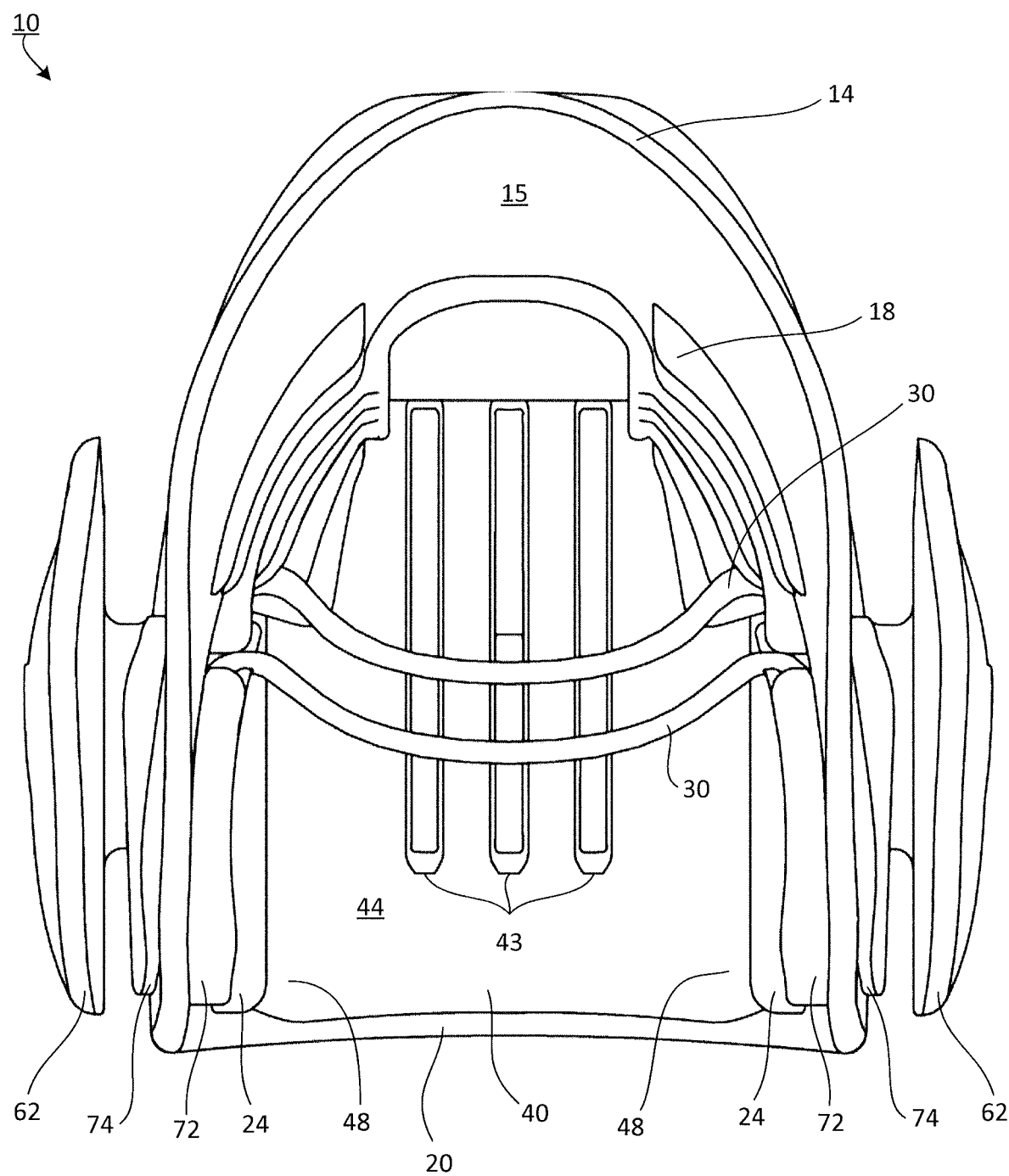
FIG. 5 is a back view of the spout cover of FIG. 1.

FIG. 5 demonstrates that the soap container assembly 40 may also have alignment and stopping ribs 43 disposed along an inwards facing surface 44 of soap container 42. These stopping ribs 43 provide more support to the soap container 42 against an end of the bath faucet 90 during and after installation. The stopping ribs 43 also assist in supporting the soap container 42 to retain a sufficient volume for soap.

Figure 6:
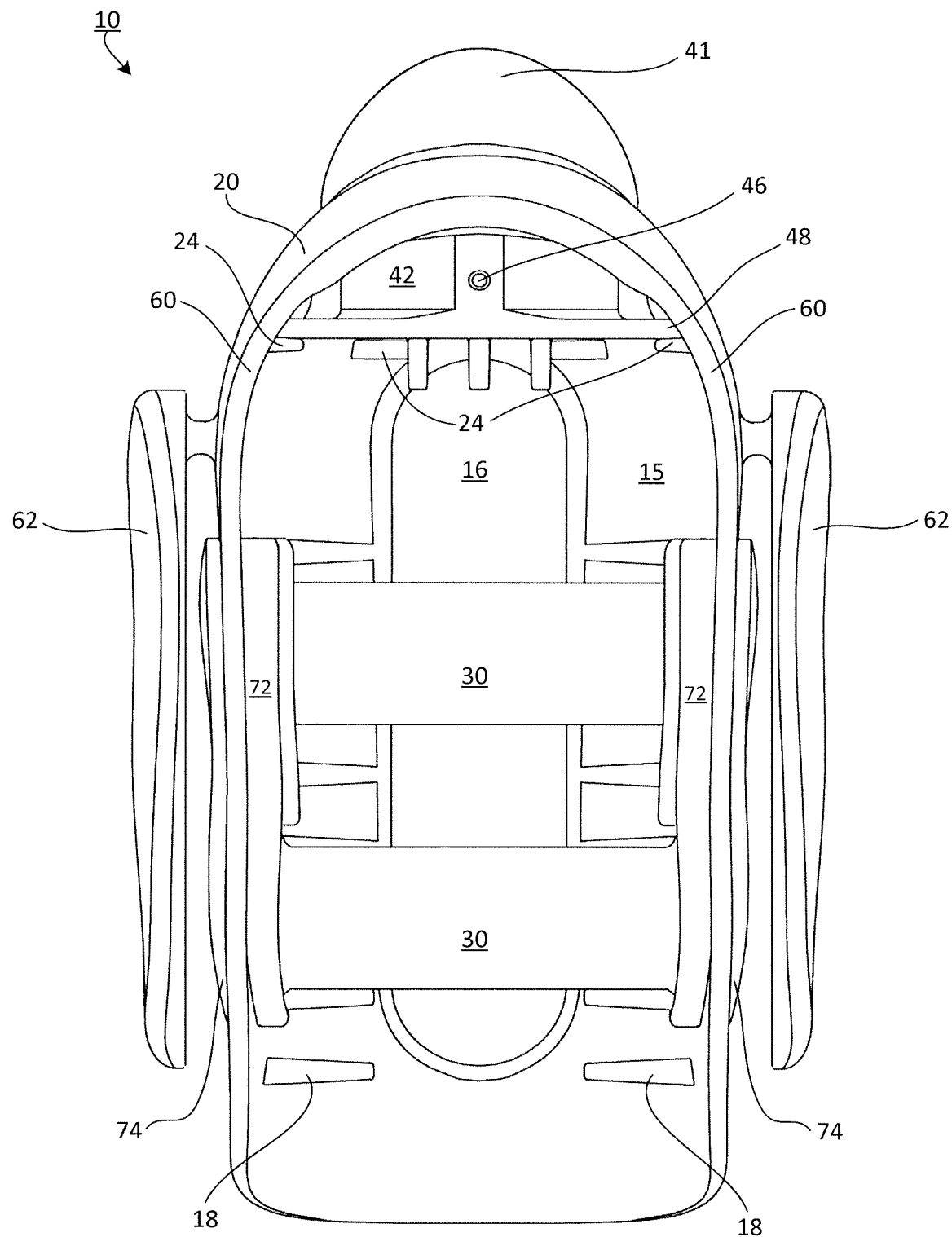
FIG. 6 is a bottom view of the spout cover of FIG. 1.
Figure 7:
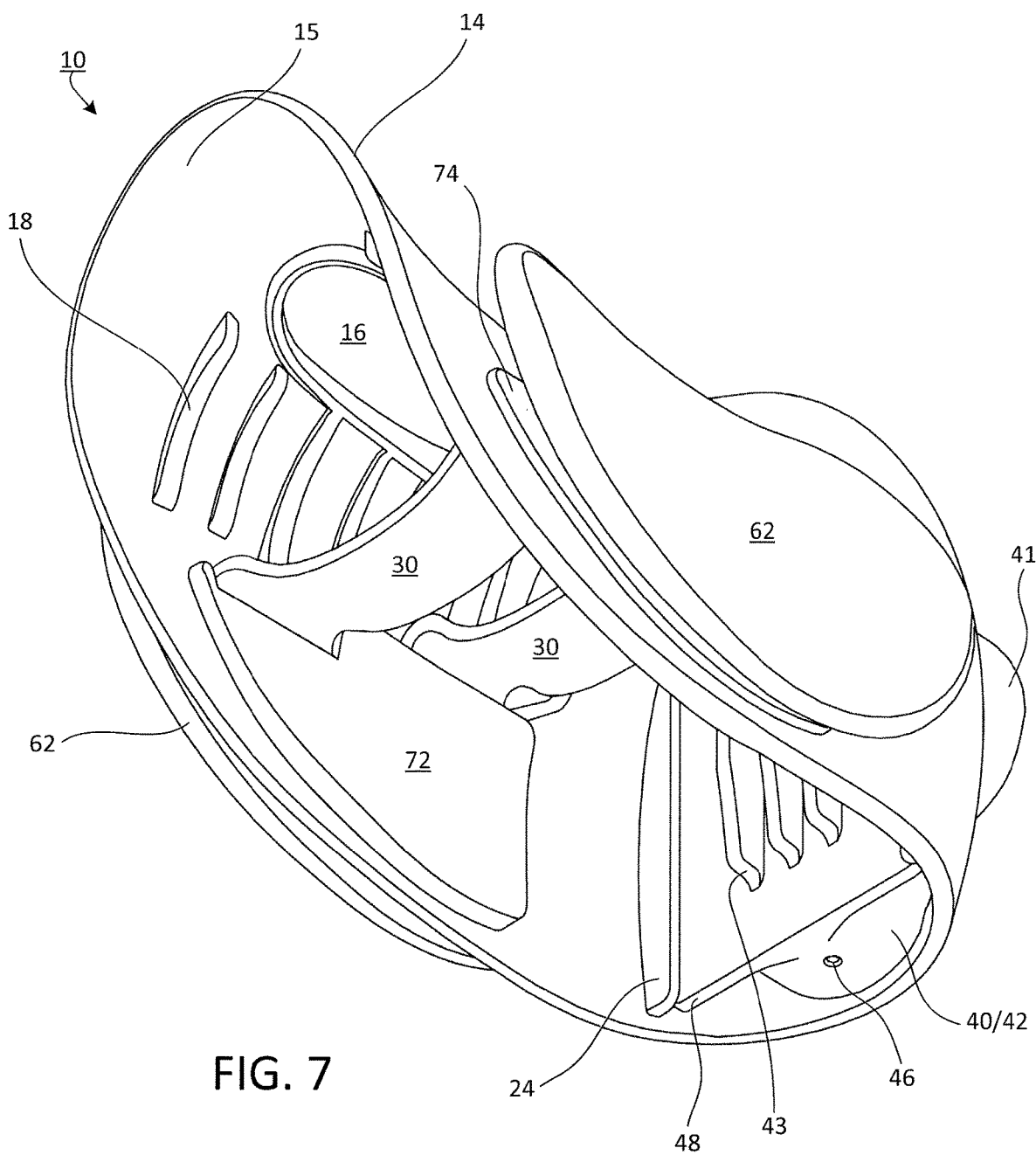
FIG. 7 is a bottom perspective view of the spout cover of FIG. 1.

As further shown in FIGS. 5 and 6, the soap container assembly 40 may also have guide edges 48, which provide the soap container assembly 42 stability and alignment. Guide edges 48 may be distal edges of the inwards facing surface 44. The guide edges 48 may be adapted to be secured within retaining channels 24 (FIG. 6).

FIG. 16 illustrates the soap container assembly 40 may also have an alignment shoulder 45 disposed adjacent to the soap container opening 41 to provide a secured fit against the front portion 20.

FIG. 6 depicts the soap drain hole 46 disposed in the soap container 42. The soap drain hole 46 is adapted to allow soap to drain therethrough and subsequently mix with a flow of water from a spout. The soap drain hole 46 may take any geometric size and/or shape to allow for drainage of liquids disposed therein. Furthermore, the flow rate of drainage of liquids can be chosen during production by providing larger or smaller soap drain holes 46.

Referring back to FIGS. 5 and 6, the front portion 20 of the body structure 12 may have retaining channels 24 to support the guide edges 48 of the soap container assembly 40 in place. The retaining channels 24 may be made integral with the body structure 12 or may be of a separate material and strongly bonded with body structure 12, such that the retaining channels 24 is adapted to firmly hold soap container assembly 40 in place.

FIGS. 5-8 show various views of the straps 30. The straps 30 are made of material that is elastic and sufficiently flexible to allow the bath spout cover 10 to be installed on and removed from the bath faucet 90, yet sufficiently rigid such that the strap 30 will not droop excessively away from the bath faucet 90 and therefore allow for proper securing of the bath spout cover 10 to the bath faucet 90. The strap 30, however, may have a slight elastic curvature (FIG. 5) that allows for simpler installation and removal of the bath faucet 90. The elastic curvature of the strap 30 in combination with the flexible properties of the material would provide a secure fit against the bath faucet 90 (FIGS. 11-12 and 14-15).

Figure 19:
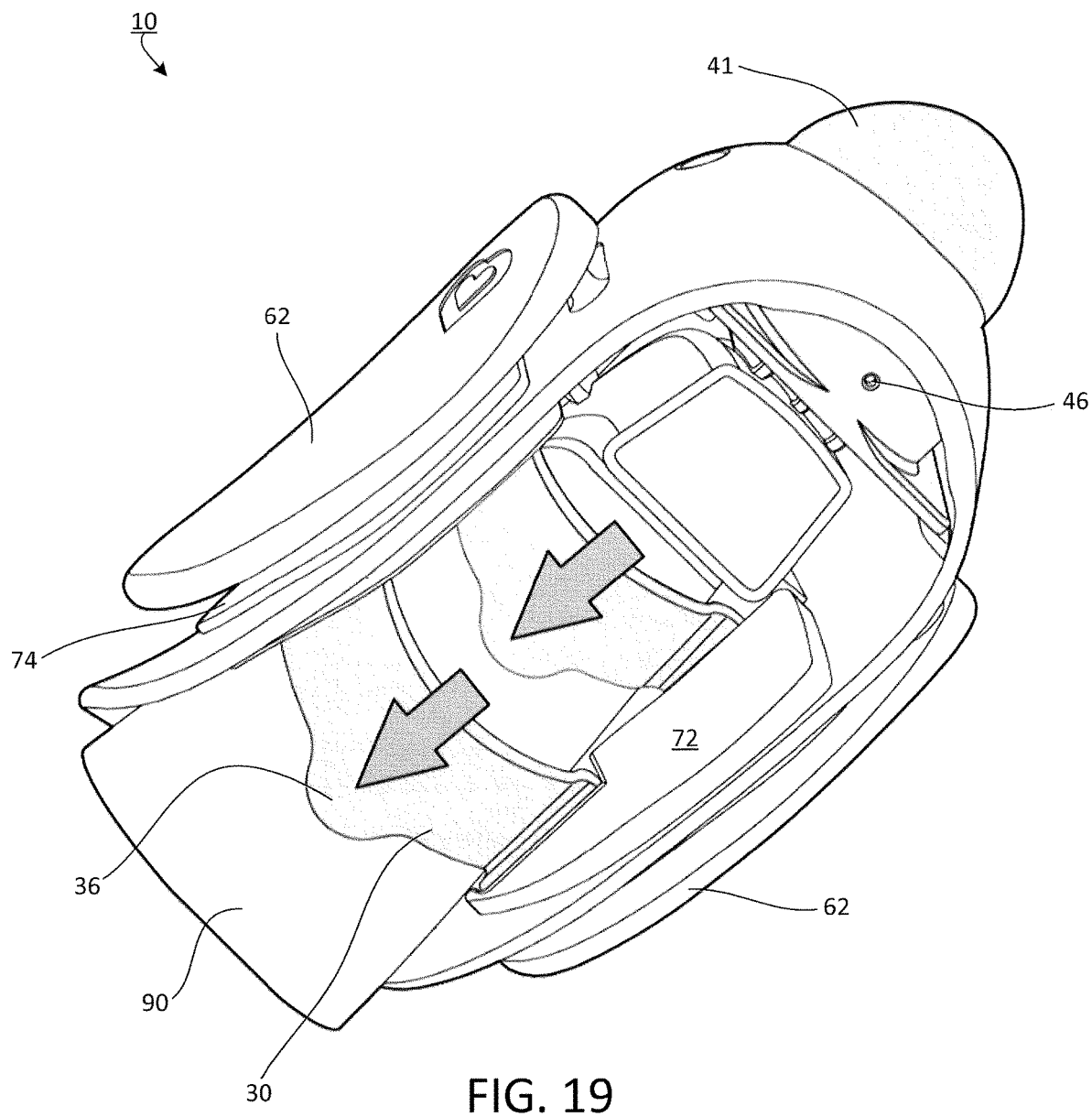
FIG. 19 is a perspective bottom view of the spout cover of FIG. 1 during installation.

FIG. 19 contemplates at least one strap 30 with a tab 36. The tab 36 provides further additional surface area to generate more friction to secure the bath faucet 90. Furthermore, the tab 36 provides a location for a user to optionally pull upon to reduce the friction force against the bath faucet 90 during installation or removal thereof.

Figure 8:
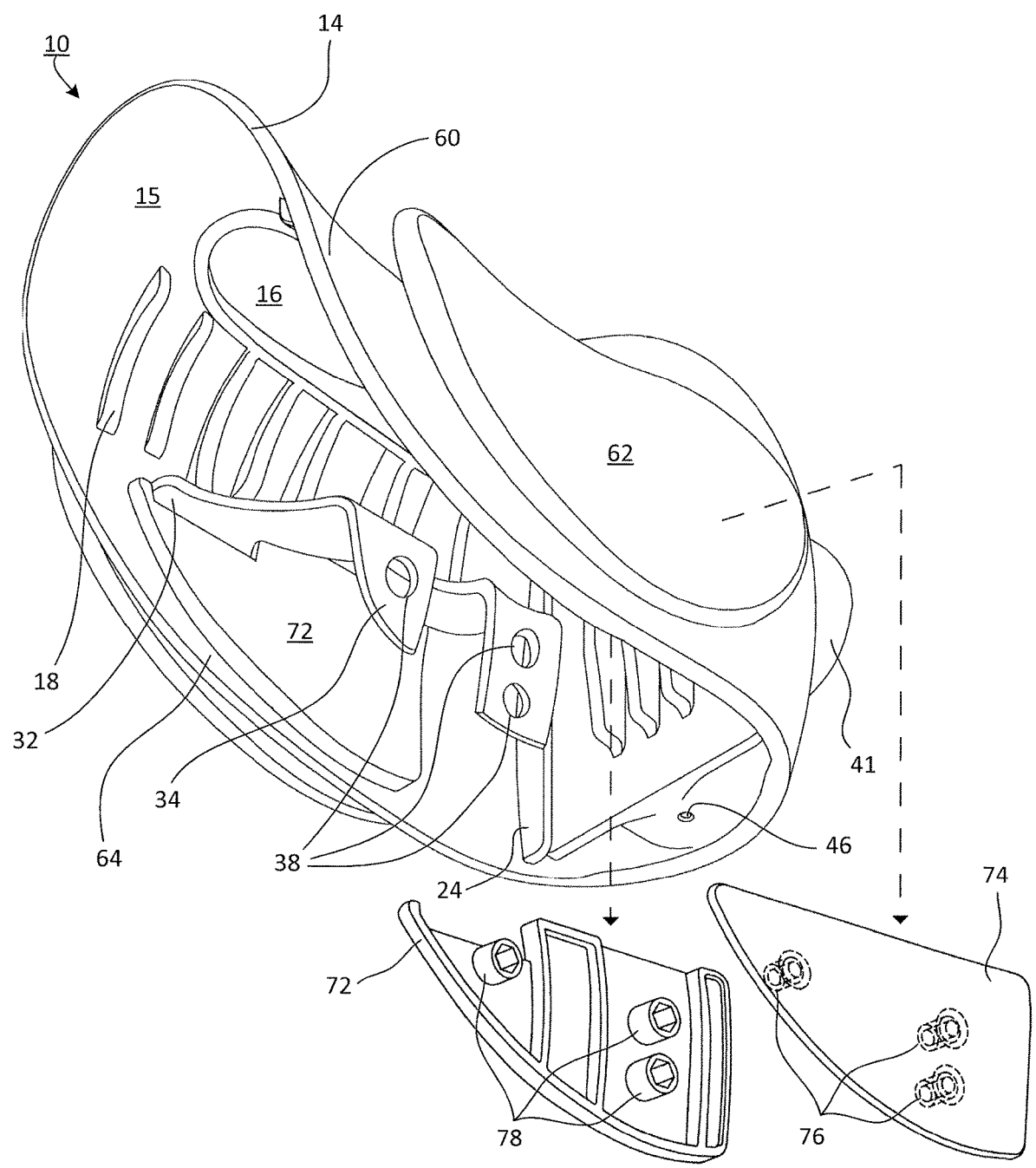
FIG. 8 is a partially exploded perspective view of the spout cover of FIG. 1.

FIG. 8 shows an opposing perspective view from FIG. 1, in which the bath spout cover 10 may further comprise locking assemblies 70 disposed on the inner sides 64 of the opposing sides 60; alignment ribs 18 disposed along an inside 15 of the upper portion 14 and the opposing sides 60; and the soap drain hole 46 disposed in the soap receptacle 42.

FIG. 8 illustrates the locking assemblies 70 comprise locking plates 72 and locking covers 74. Locking plates 72 have receiving apertures 78 that are adapted to receive lugs 76, which are disposed on locking covers 74. It is to be understood that the locking plates 72 and the locking covers 74 may have different configurations, such as the locking plate 72 having the lugs 76, while the locking cover 74 has the apertures 78. One of ordinary skill in the art would understand that the locking plate 72 and locking cover 74 may be secured to each other in a variety of different ways according to this subject disclosure.

Straps 30 may have one or more engaging holes 38. More specifically, the engaging holes 38 may be typically found at the first 32 and/or second 34 ends of the straps 30. The first 32 and/or second 34 ends of the strap 30 may be constructed to be secured to the locking plate 72 and locking plate 74 in a variety of different ways. For example, in FIG. 8, the first 32 and/or second end 34 may curve over and downwards into the locking assemblies 70. As shown in FIGS. 10-15, in an assembled position, the engaging holes 38 of straps 30 are disposed around lugs 76 and receiving apertures 78. Thus, the first 32 and/or second 34 ends are disposed between locking plates 72 and one of the opposing sides 60. The opposing side 60 is then disposed and secured between locking plates 72 and locking covers 74. These locking assemblies 70 result in secure fits that prevent slippage of the straps 30.

Although shown in FIG. 8 as a 2-1 configuration of engaging holes 38 on the straps 30, and lugs 76 and receiving apertures 78 of the locking assemblies 70, it is to be understood that any configuration of engaging holes 38, lugs 76 and receiving apertures 78 that prevents slippage of any number of straps 30 may be used. Similarly, locking plates 72 and locking covers 74 may take any geometric shape and/or size to secure ends 32, 34 of the strap 30 therein. Although only one locking plate 72 and one locking cover 74 is shown per side to secure two straps 30, it is to be understood that any number of locking plates 72 and locking covers 74 may be used. Although shown as hexagonal, the lugs 76 and the receiving apertures 78 may be of any geometric shape and size that provides proper securing and mating.

Similarly, it is to be understood that other mechanisms of engaging the strap 30 to the locking assemblies 70 are within the scope of this application. For example, the engaging holes 38 may instead be one or more recesses or protrusions. In such an embodiment, the locking assemblies would instead have mating recesses or protrusions to secure the strap 30 in place. In other words, the locking plate 72 and locking cover 74 would have mating recesses or protrusions to mate with the protrusions or recesses of the strap 30, respectively. Furthermore, the strap 30 may have first 32 and/or second 34 ends of curving under and upwards into the locking assemblies 70.

Figure 26:
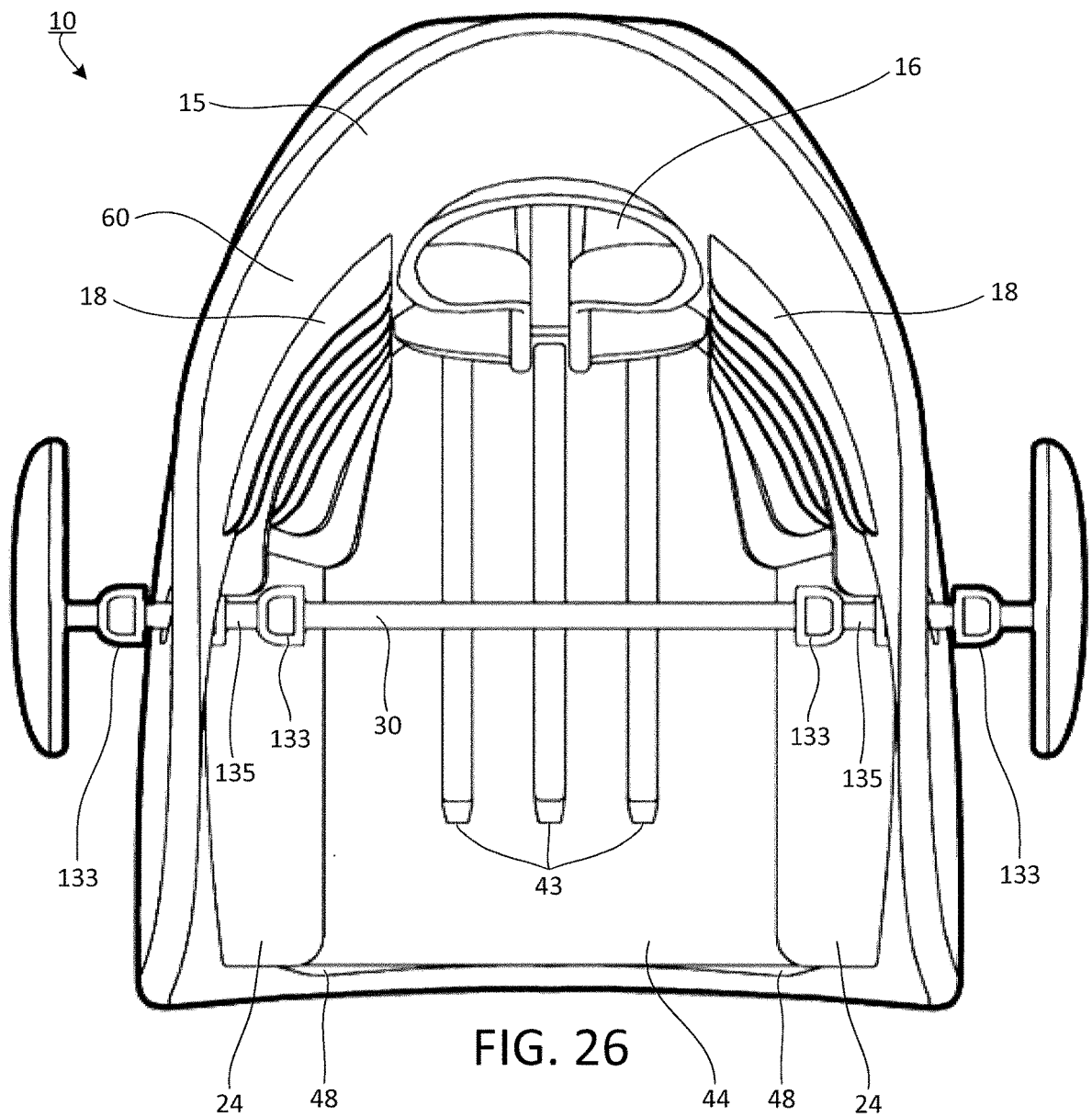
FIG. 26 is a back view of the spout cover in FIG. 25.
Figure 27:
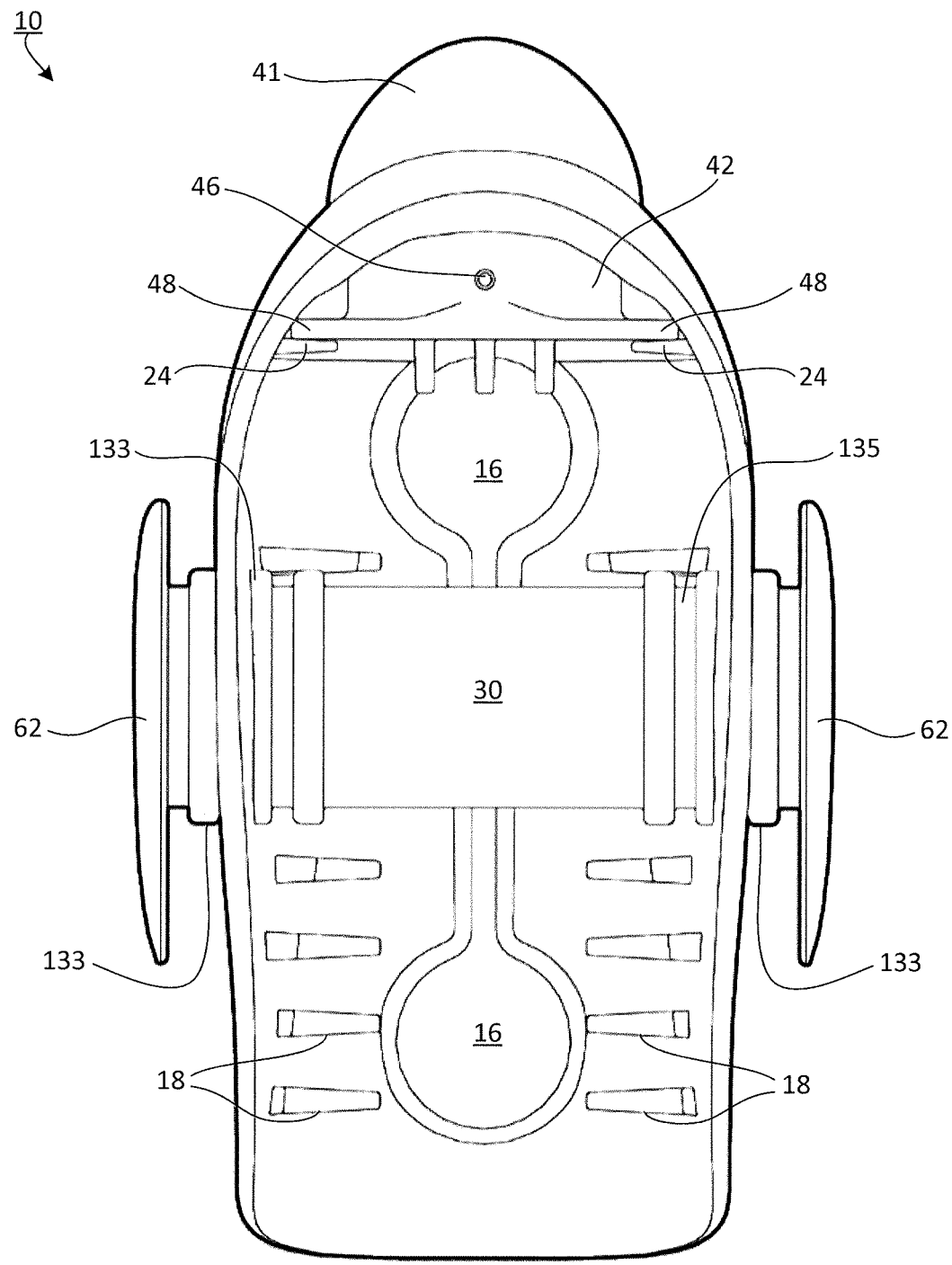
FIG. 27 is a bottom view of the spout cover in FIG. 25.
Figure 28:
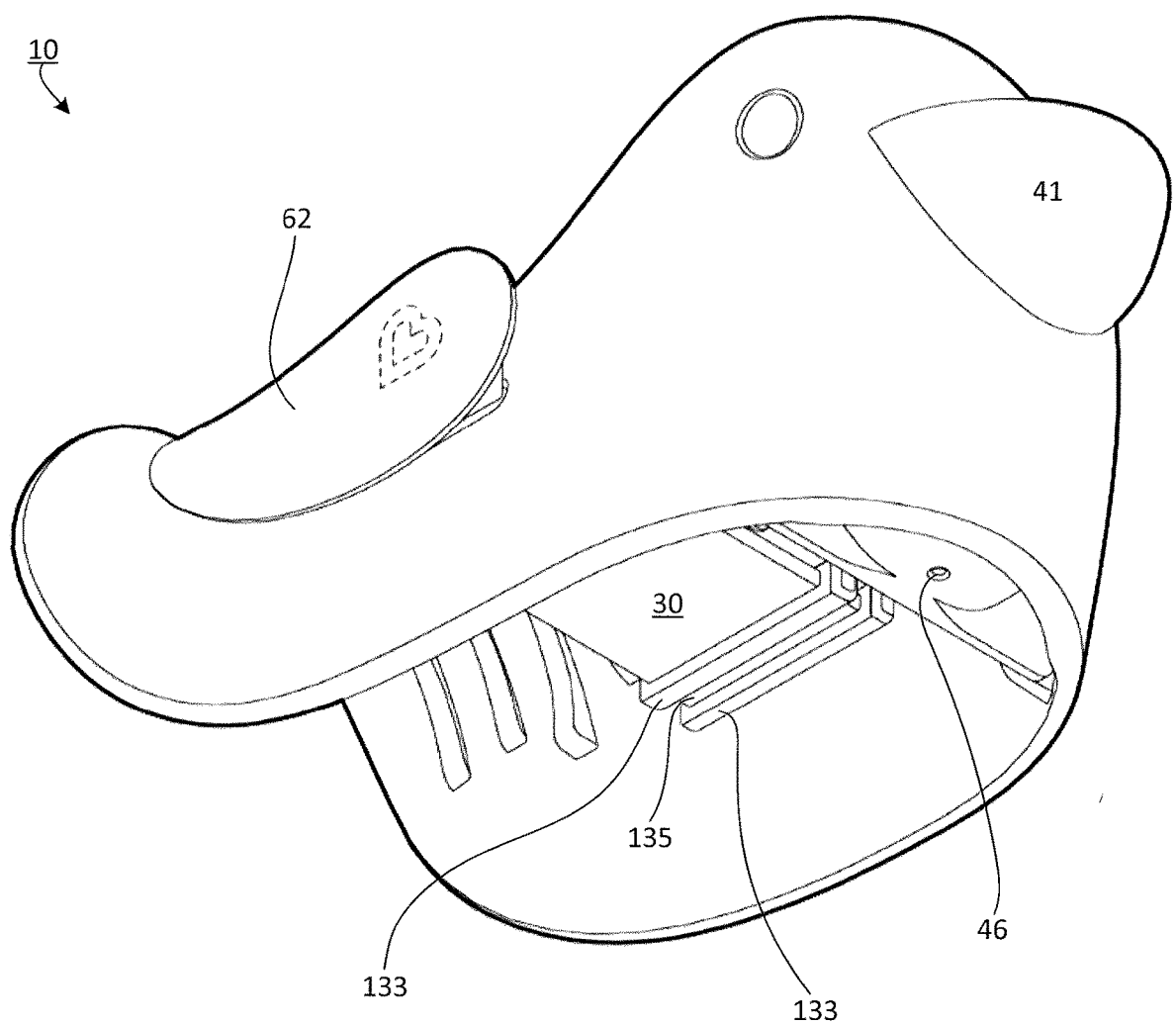
FIG. 28 is a bottom perspective view of the spout cover in FIG. 25.
Figure 29:
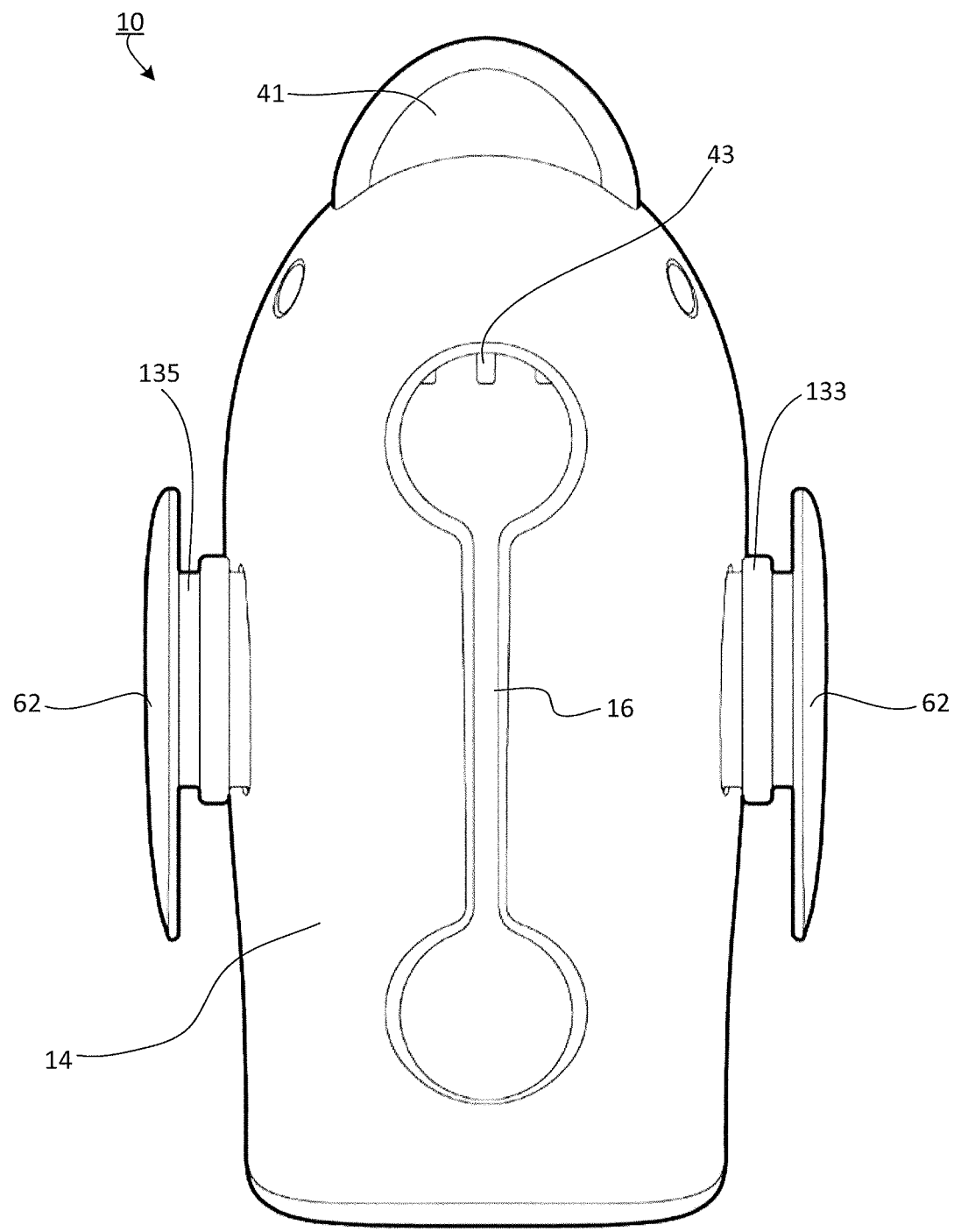
FIG. 29 is a top view of the spout cover in FIG. 25.
Figure 30:
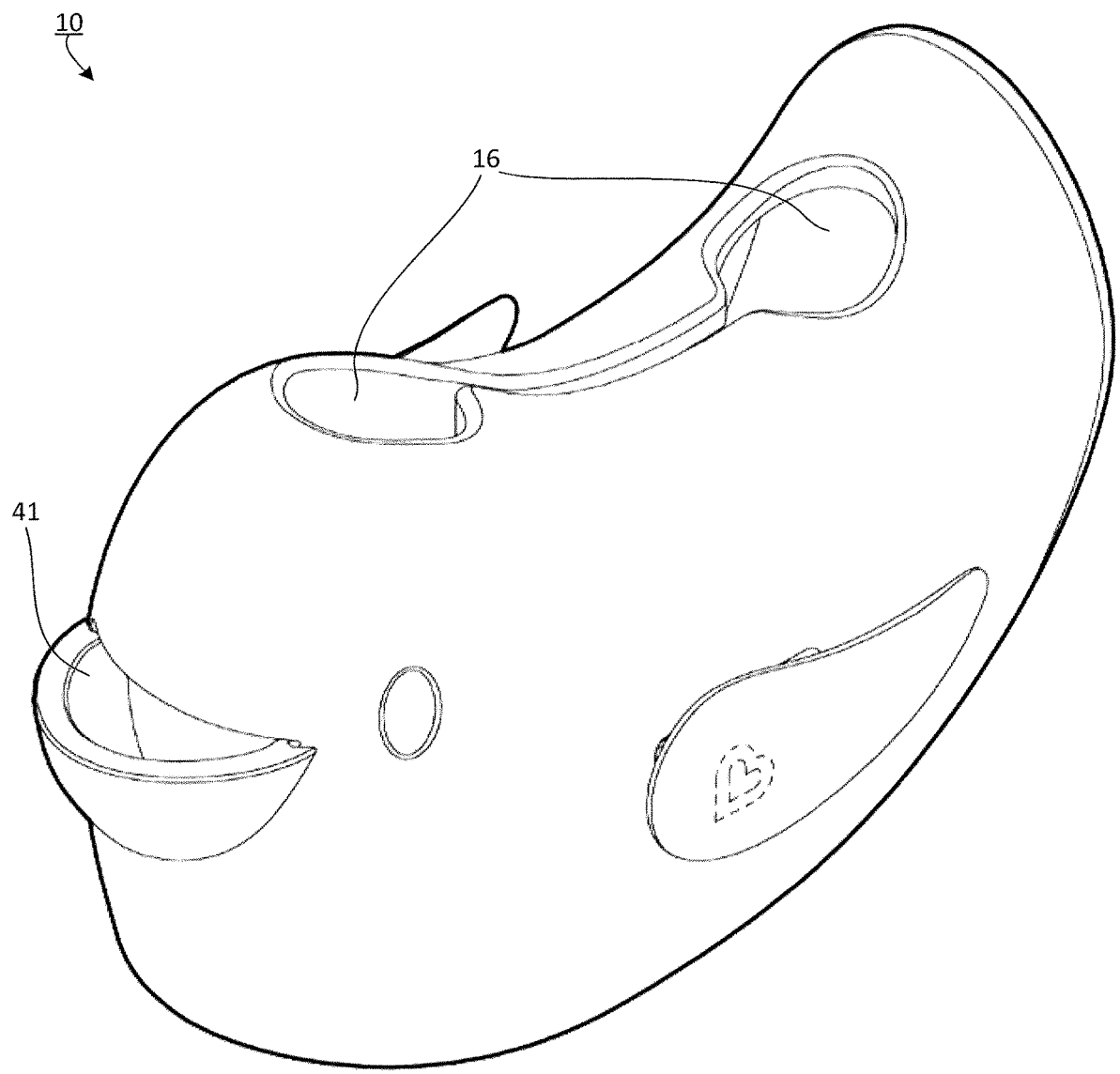
FIG. 30 is a top perspective view of the spout cover in FIG. 25.
Figure 31:
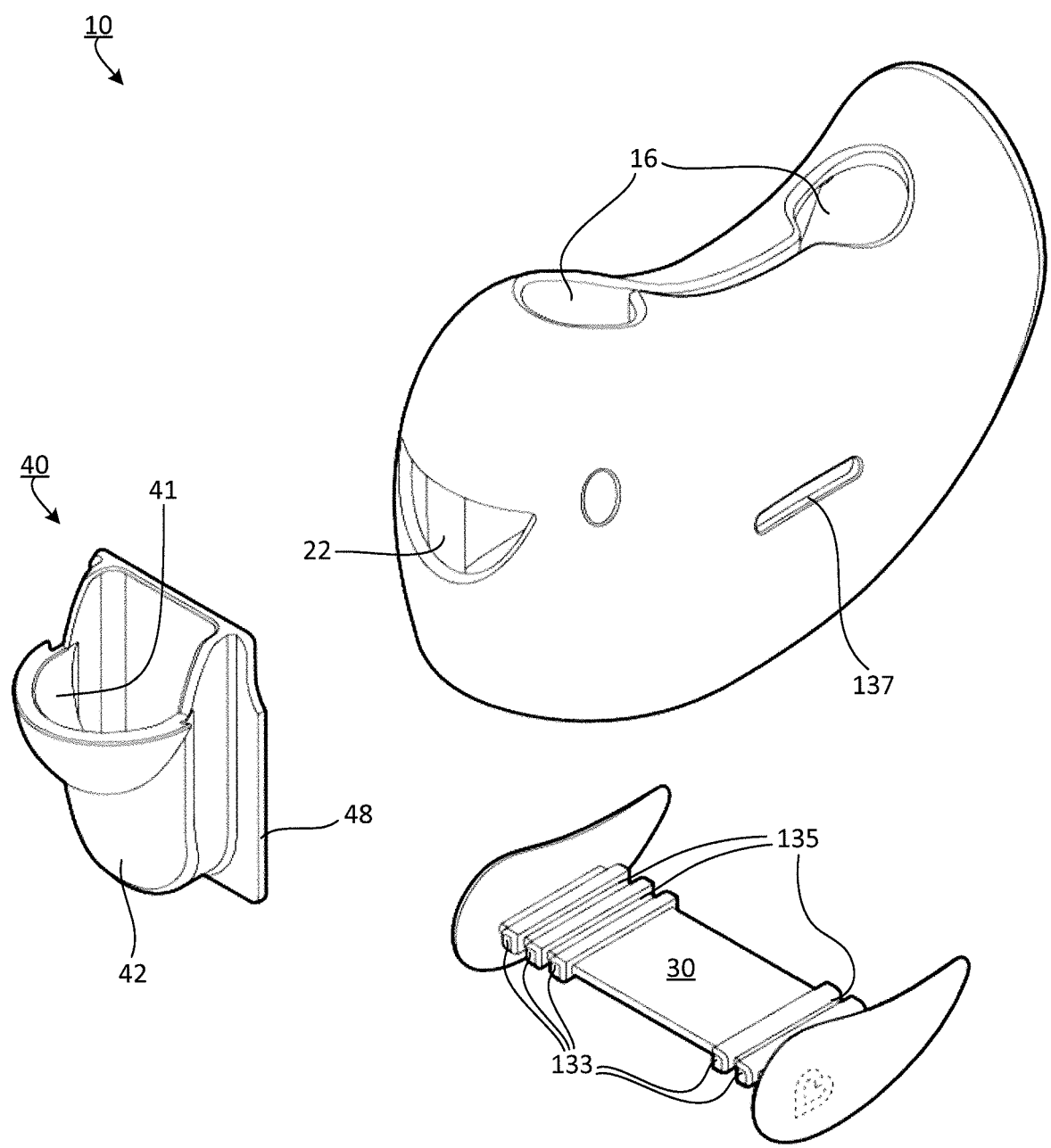
FIG. 31 is an exploded view of the spout cover in FIG. 25.
Figure 32:
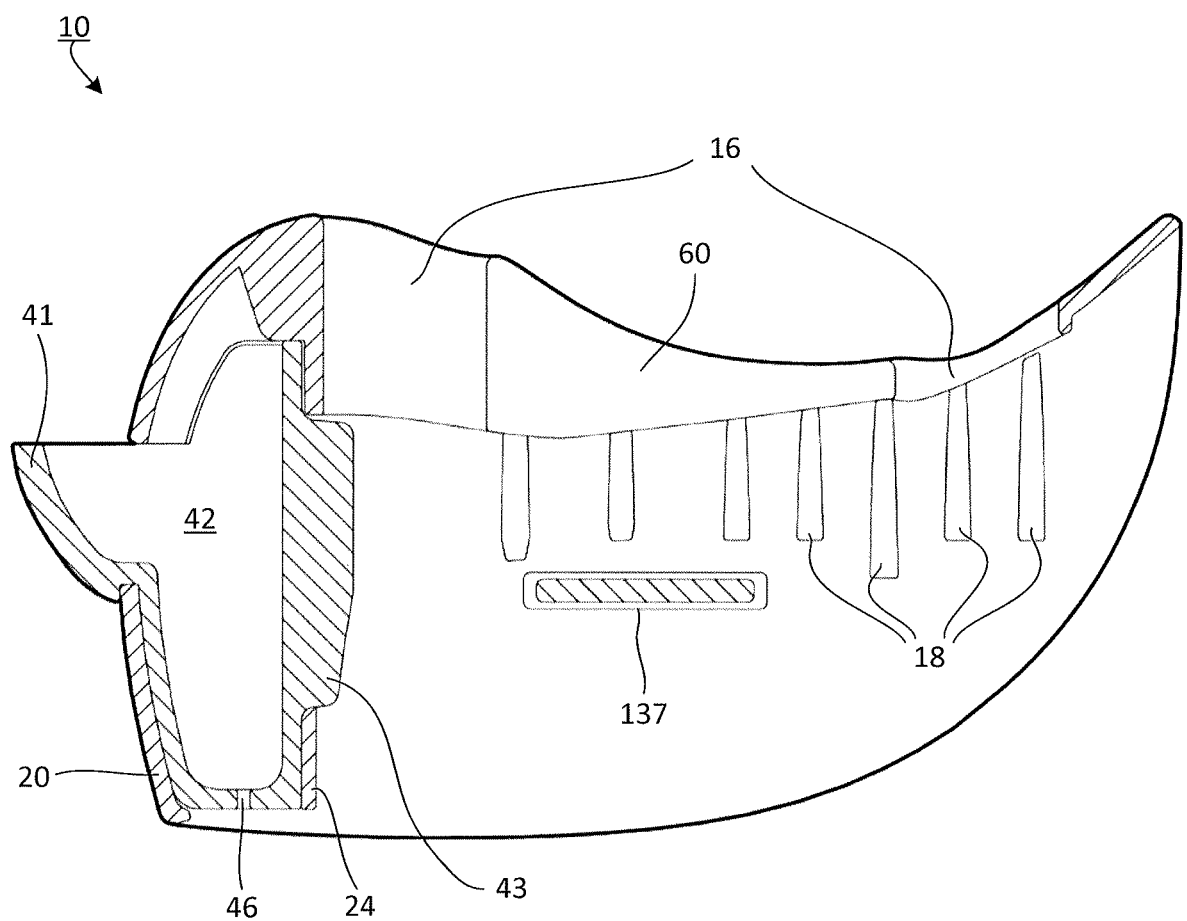
FIG. 32 is a cross section view of the spout cover in FIG. 25.

Although not shown, it is further contemplated that the locking plates 72 may be constructed such that the locking plates 72 and the alignment ribs 18 are one integral unit. In this embodiment, the locking plates 72 and the alignment ribs 18 would FIGS. 31-32 contemplate that at least one receiving port 137 may be defined by one of the side portions 60 of the body structure 12 for receiving a first end 32 of the strap 30 (FIG. 26). Another receiving port 137 may also be defined in the second of the side portions 60 of the body structure 12 for receiving a second end 34 of the strap 30.

FIGS. 26-28 and 31 demonstrate that the strap 30 may have at least one protrusion 133 or recess 135. The strap 30 may then be secured through at least one receiving port 137 disposed on the opposing sides. In such an embodiment, the protrusions 146 would be matingly engaged with the receiving ports 137 and provide a similar secure fit, such that the strap 30 would be prevented from slipping.

When the strap 30 utilizes a protrusion 133, the protrusion 133 provides enough resistance against receiving ports 137 to prevent strap 30 from slipping. When the strap 30 has more than one protrusion 133, the protrusions 133 provide enough resistance to prevent slippage but also allow a user to adjust the amount of slack strap 30 has by picking and choosing which distal protrusion 133 to use. Although shown as substantially rectangular, the protrusions 133 may take any geometric shape and size to secure the strap 30 and prevent slippage, while simultaneously allowing a user to adjust the amount of slack of the strap 30 on the inside of the body structure 12.

As stated above, it is also contemplated that the strap 30 may have at least one recess 135 that provides a locking position, wherein the receiving port 137 would be matingly engaged with the recess 135 and provide enough security to prevent slippage. Similar to the usage of protrusions 133, if the strap 30 has multiple recesses 135, a user can adjust the amount of slack strap 30 has by picking and choosing which recess 135 to use.

Although not shown, it is further contemplated that the body structure 12 may have a locking assembly 70 on one of the opposing sides 60 in combination with a receiving port 137 on the other of the opposing sides 60. The strap 30 would then have protrusion(s) 133 and/or recess(es) 135 on the first end 32 of the strap 30 and would have the second end 34 of the strap 30 disposed between the locking assembly 26 on the other side. This combination may provide the bath spout cover 10 the ability to adjust the amount of slack the strap 130 has on the inside of the body structure 12, while also offering the security of the second end 34 of the strap 30 being disposed within the locking assembly 70.

Referring back to FIGS. 8-15, the opposing sides 60 of the bath spout cover 10 may further comprise a protective guard 62 in the shape of an appendage such as wings 62. These wings 62 may provide additional security to the locking covers 74 by preventing a user from inadvertently hitting and knocking off locking covers 74. Although shown as a wing, any shape or size that provides sufficient coverage and/or protection of the locking covers 74 may be used for the protective guard 62.

As shown in FIGS. 25-29, in an embodiment wherein the strap 30 has a plurality of protrusions 133 or recesses 135, the protective guard 62 may be directly attached to an end of the strap 30, such that the protective guards 62 provide the strap 30 additional security from slipping out through receiving ports 137. Furthermore, the protective guard 62 may then also provide the function of being used as a handle or grip for the first 32 and second end 34 of the strap 30.

Figure 20:
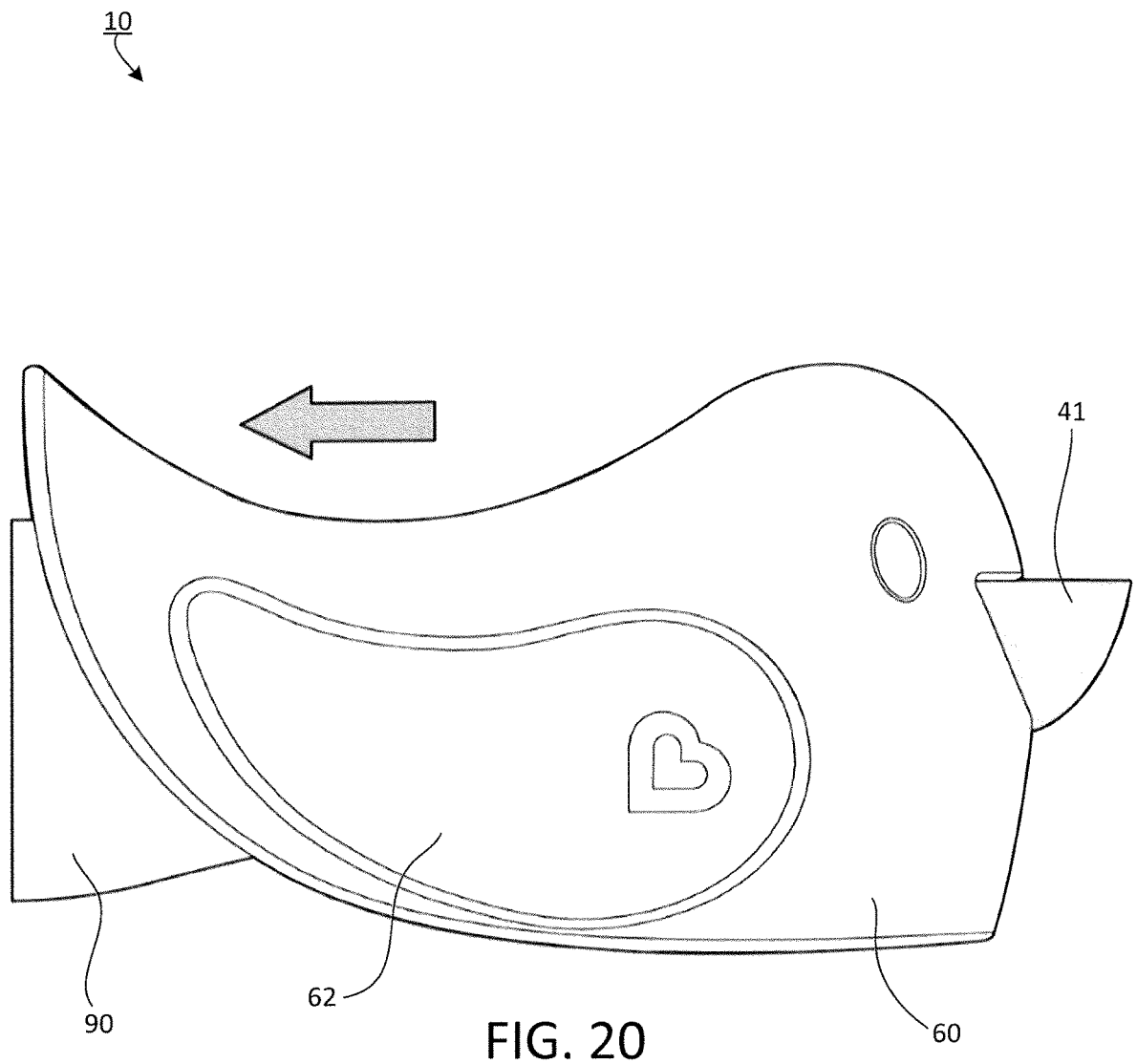
FIG. 20 is a side view of the spout cover of FIG. 1 during installation.

FIGS. 17-21 show various steps of installation, removal and use of the bath spout cover 10. During installation, the spout cover 10 may be tilted diagonally downwards (FIG. 18) to allow the bath faucet 90 to enter the spout cover 10. As the bath faucet 90 pushes against the straps 30, the straps 30 allows for some degree of flexibility to stretch elastically and provide the bath faucet 90 some room to maneuver into position. The valve 92 of the bath faucet 90 enters and travels along the elongated opening 16 as a user tilts the spout cover 10 back to a parallel orientation. Finally as shown in FIGS. 17, 19 and 20, the user pushes the spout cover 10 against the bath faucet 90.

Removal, on the other hand, is a simple reverse order of the above steps. That is, the user first horizontally pulls the spout cover 10 away from the bath faucet 90. Next, the user then tilts the spout cover 10, such that the front portion 20 of the spout cover 10 faces downwards. Finally, the user pulls the spout cover 10 away from the bath faucet 90.

During installation of a bath spout cover 10 having protrusion(s) 133 or recess(es) 135 on the strap 30, a user would first loosen the strap 30 by moving the first 32 and/or second 34 end(s) of the strap 30 inwards through the receiving port(s) 137, thus allowing maximum slack of the strap 30 and volume. Then, the user would follow the same steps as stated above. That is, the spout cover 10 is tilted diagonally downwards to allow the bath faucet 90 to enter the spout cover 10. As the bath faucet 90 pushes against the strap 30, the strap 30 allows for some degree of flexibility to stretch and provide the bath faucet 90 some room to maneuver. The valve 92 of the bath faucet 90 enters and travels along the elongated opening 16 as a user tilts the spout cover 10 back to a parallel orientation. Then, the user pushes the spout cover 10 against the bath faucet 90. The final step for this spout cover 10 would be to tighten the strap 30 by moving the first 32 and/or second 32 end(s) of the strap outwards through the receiving port(s) 137, allowing minimal slack of the strap 30 and thus providing maximum security against the bath faucet 90.

During removal of this bath spout cover 10, the steps would similarly be largely reversed. First, the user would loosen the strap 30 by moving the first 32 and/or second 34 end(s) of the strap 30 inwards through the receiving port(s) 137, thus allowing maximum slack of the strap 30 and volume. Then, the user would follow the same steps for removal as stated above. That is, the user horizontally pulls the spout cover 10 away from the bath faucet 90. Next, the user then tilts the spout cover 10, such that the front portion 20 of the spout cover 10 faces downwards. The user then pulls the spout cover 10 away from the bath faucet 90. The user may optionally choose to tighten the strap 30 for storage.

Figure 21:
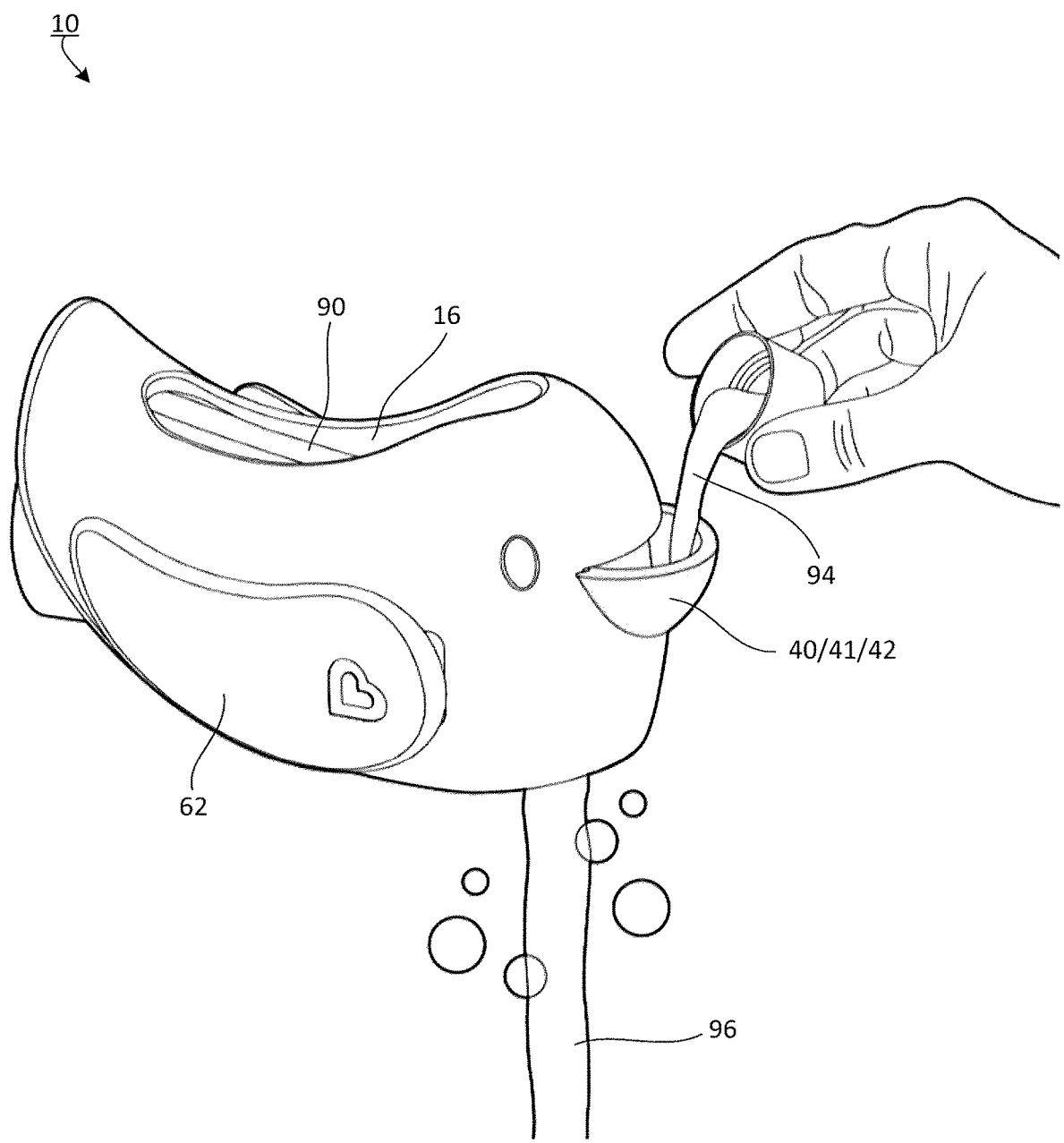
FIG. 21 is a perspective view of the spout cover of FIG. 1 in use.

FIG. 21 illustrates that a user may pour soap 94 into the soap receptacle receiving portion 41. As the soap 94 flows down into the soap receptacle receiving portion 41, the soap 94 fills the soap receptacle 42, and slowly drains out of the soap drain hole 46. As the soap 94 leaves the soap drain hole 46, it mixes with water to create soapy water 96.

Figure 24:
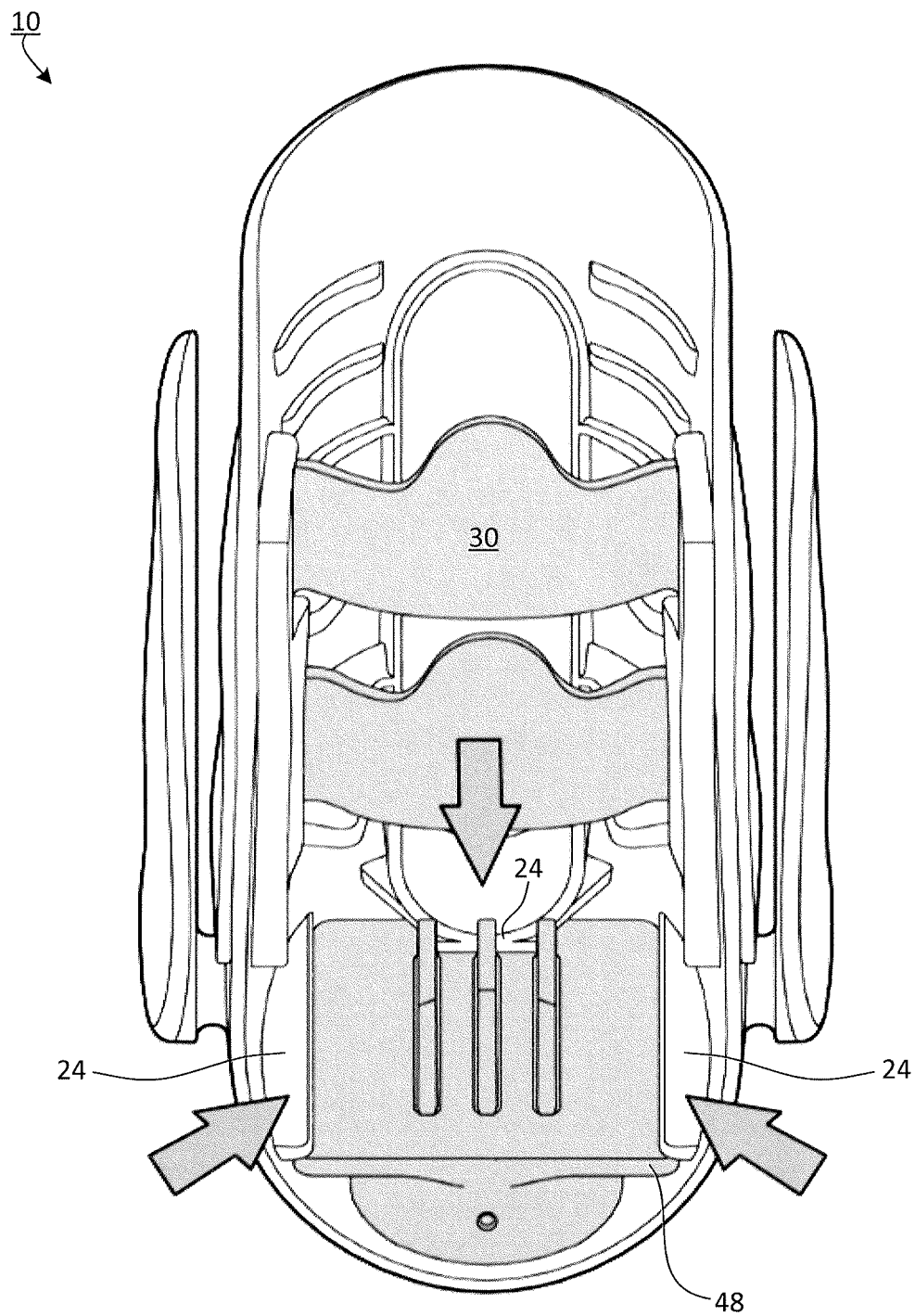
FIG. 24 is a bottom view of the spout cover of FIG. 1 during removal.
Figure 25:
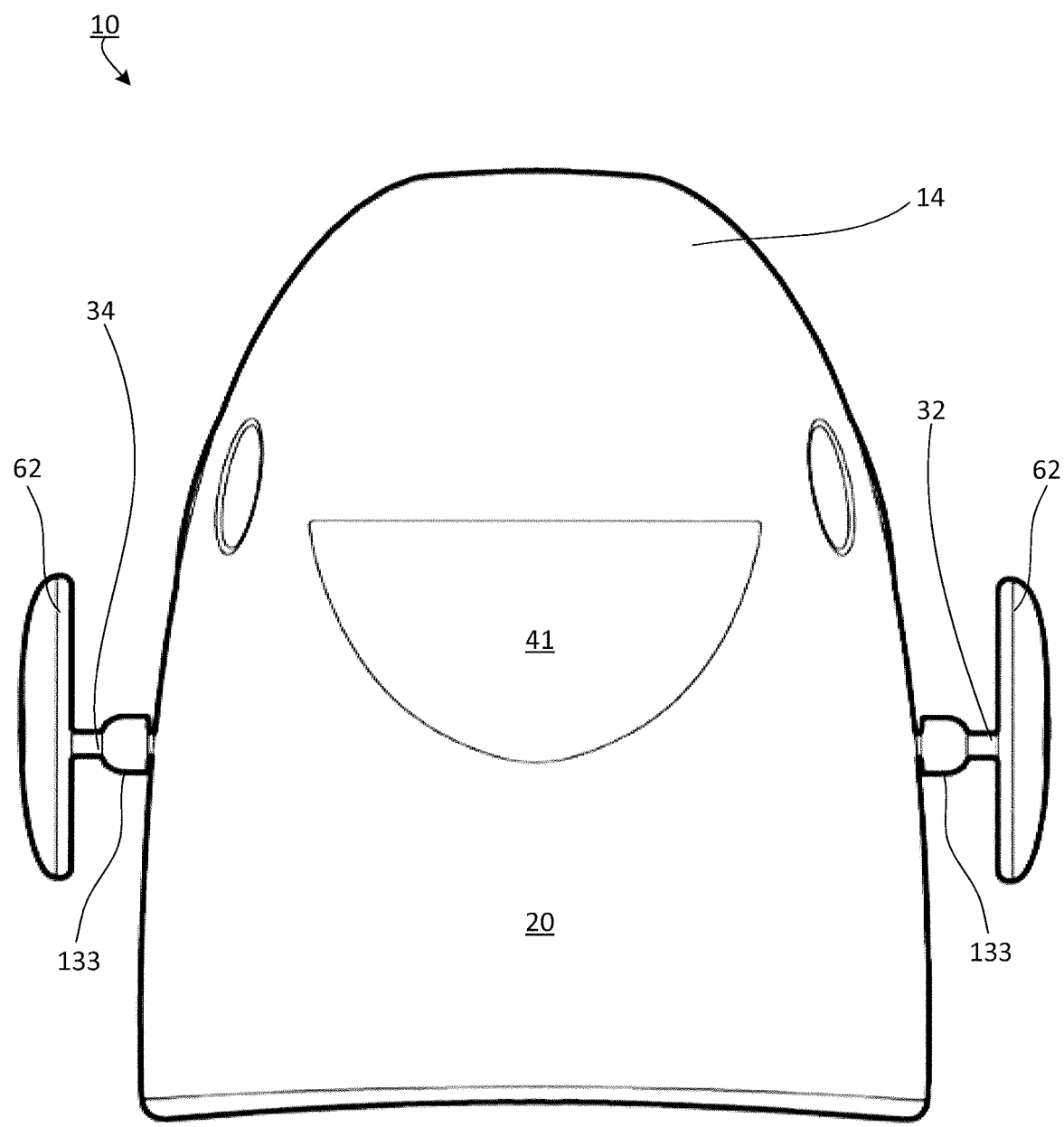
FIG. 25 is a front view of another embodiment of a spout cover.

FIGS. 22-24 show various steps during installation and removal of the soap container assembly 40 from the front portion 20 of the body structure 12. As shown, a user may pinch the soap receptacle receiving portion 41, such that the soap receptacle receiving portion 41 may fit through the opening 22 in the front portion 20. The user would then push the soap receptacle receiving portion 41 through the opening 22 in the front portion 20. From the inside, the user would then pull the soap receptacle assembly 40 away from the body structure 12 with enough force such that the guide edges 48 and/or the retaining channels 24 distort enough to allow removal of the soap receptacle assembly 40.

To install the soap receptacle assembly 40 into the body structure 12, a user would simply align and push the soap receptacle receiving portion 41 with and subsequently through the opening 22 in the front portion 20. The user will know to stop pushing the soap receptacle receiving portion 41 through the opening 22 in the front portion 20 when the alignment shoulder 45 (FIG. 15) pops through the opening 22. The user should then push guide edges 48 towards the front portion 20 until the retaining channels 24 are behind the guide edges 48 and further away from the front portion 20 in comparison to the guide edges 48.

The illustrations and examples provided herein are for explanatory purposes and are not intended to limit the scope of the appended claims. It will be recognized by those skilled in the art that changes or modifications may be made to the above described embodiment without departing from the broad inventive concepts of the invention. It is understood therefore that the invention is not limited to the particular embodiment which is described, but is intended to cover all modifications and changes within the scope and spirit of the invention.

What is claimed:

1. A bath spout cover, comprising:
   a body structure having an upper portion, two sides extending from the upper portion, and a front portion;
   a soap receptacle disposed in the body structure; and
   at least one strap connecting an inner side of the two sides, wherein the at least one strap is secured against the inner side by a locking mechanism having a locking plate disposed inside the body structure and a locking cover on an outer surface of the side of the body structure, the locking cover further covered by a protective guard.

2. The bath spout cover in claim 1, wherein the locking mechanism comprises:
   the locking cover;
   the locking plate;
   at least one lug; and
   at least one aperture
   wherein an end of the at least one strap is disposed between the locking cover and the locking plate.

3. The bath spout cover in claim 2, wherein the at least one aperture of the locking mechanism is adapted to receive and secure the at least one lug.

4. The bath spout cover in claim 2, wherein the at least one strap further having at least one engaging hole, the engaging hole disposed around the lug of the locking mechanism.

5. The bath spout cover in claim 2, wherein the bath spout cover has two locking mechanisms, one of each of the two locking mechanisms disposed on one of each of the two sides.

6. A bath spout cover comprising:
   a body structure having an upper portion, two sides extending from the upper portion and a front portion;
   a soap receptacle removably disposed in the front portion; and
   at least one strap contained within the body structure and connecting an inner side of the two sides by a locking mechanism having a locking plate disposed inside the body structure and a locking cover on an outer surface of the side of the body structure, the locking mechanism spanning a thickness of the body structure and covered by a protective guard.

7. The bath spout cover in claim 6, wherein the locking mechanism comprises:
   the locking cover;
   the locking plate;
   at least one lug; and
   at least one aperture;
   wherein an end of the at least one strap is disposed between the locking cover and the locking plate.

8. The bath spout cover in claim 7, wherein the at least one aperture is adapted to receive and secure the at least one lug.

9. The bath spout cover in claim 7, wherein the at least one strap further having at least one engaging hole, the engaging hole disposed around the lug.

10. The bath spout cover in claim 7, wherein the bath spout cover has two locking mechanisms, one of each of the two locking mechanisms disposed on one of each of the two sides.

11. A bath spout cover, comprising:
    a body structure having an upper portion, two sides extending from the upper portion, and a front portion;
    a soap receptacle disposed in the front portion; and
    at least one strap connecting an inner side of the two sides, wherein the at least one strap is secured to at least one of the inner sides of the two sides via at least one locking mechanism having a locking plate disposed inside the body structure and a locking cover on an outer surface of the side of the body structure that locks the strap within the body structure, the at least one locking mechanism extending from the inner side to the outer surface of the body structure and covered by a protective guard.

12. The bath spout cover in claim 11, wherein the locking mechanism comprises:
    the locking cover;
    the locking plate; and
    at least one lug; and
    at least one aperture,
    wherein an end of the at least one strap is disposed between the locking cover and the locking plate, the lug disposed on either of the locking plate or the locking cover and the aperture located on the other.

13. The bath spout cover in claim 12, wherein the at least one aperture of the locking mechanism is adapted to receive and secure the at least one lug.

14. The bath spout cover in claim 12, wherein the bath spout cover has two locking mechanisms, one of each of the two locking mechanisms disposed on one of each of the two sides.

15. The bath spout cover in claim 12, wherein the at least one strap further having at least one engaging hole, the engaging hole disposed around the lug.

* * * * *